United States Patent
Miyachi et al.

(10) Patent No.: US 8,140,800 B2
(45) Date of Patent: Mar. 20, 2012

(54) STORAGE APPARATUS

(75) Inventors: Kazunari Miyachi, Ebina (JP);
Yoshiaki Muto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 12/174,181

(22) Filed: Jul. 16, 2008

(65) Prior Publication Data

US 2009/0300309 A1    Dec. 3, 2009

(30) Foreign Application Priority Data

Jun. 2, 2008  (JP) ................................. 2008-144683

(51) Int. Cl.
*G06F 12/00*  (2006.01)
(52) U.S. Cl. ....................... 711/165; 711/156
(58) Field of Classification Search .................. 711/165, 711/156
See application file for complete search history.

(56) References Cited

U.S. PATENT DOCUMENTS

| | | | |
|---|---|---|---|
| 2002/0053009 A1* | 5/2002 | Selkirk et al. | 711/162 |
| 2005/0066095 A1* | 3/2005 | Mullick et al. | 710/200 |
| 2006/0047872 A1 | 3/2006 | Nakagawa et al. | |
| 2008/0175112 A1* | 7/2008 | Den Hollander et al. | 369/47.12 |

FOREIGN PATENT DOCUMENTS

JP    200672435    3/2006

* cited by examiner

*Primary Examiner* — Hashem Farrokh
(74) *Attorney, Agent, or Firm* — Brundidge & Stanger, P.C.

(57) ABSTRACT

Upon receiving an access request from a server, a microprocessor allocates a free slot as a data storage destination that is different from the LU# and LBA designated as a storage destination of user data, stores user data and data identifying information for identifying the user data in the free slot, and zero-clears the pre-updated data slot designated with the LU# and LBA. During a subsequent read access, the microprocessor accesses the data slot and, if the read data identifying information and the data identifying information designated in the read access from the server coincide, transfers this read data to the server as correct data, and, if the read data identifying information and the data identifying information designated in the read access from the server do not coincide, performs processing for recovering correct data based on the read data identifying information.

10 Claims, 24 Drawing Sheets

FIG.2
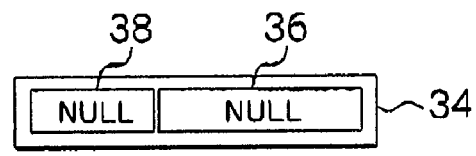
FIG.3
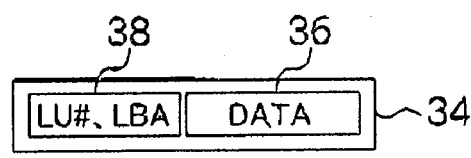
FIG.4
| RELEASE WAITING SLOT POINTER | PRE-RELEASE LU#, LBA | |
|---|---|---|
| POINTER (HDD#, ADDRESS) | LU#+LBA | ~60 |
| ⋮ | ⋮ | |
| | | |

FIG.5

| FREE SLOT POINTER COLUMN 68 | PRE-RELEASE LBA 70 | 66 |
|---|---|---|
| POINTER (HDD#, ADDRESS) | PRE-RELEASE LBA | |
| ⋮ | | |

FIG.6

| LBA 74 | ALLOCATED SLOT POINTER 76 | 72 |
|---|---|---|
| 1 | POINTER (HDD#, ADDRESS) | |
| ⋮ | ⋮ | |
| nnnnnnnn | POINTER (HDD#, ADDRESS) | |

FIG.7

| RAID GROUP 80 | HDD#1 82 | HDD#2 84 | HDD#3 86 | HDD#4 88 |
|---|---|---|---|---|
| 1-1 | 0 | 0 | 2 | 0 |
| ⋮ | ⋮ | ⋮ | ⋮ | ⋮ |
| x-y | 0 | 0 | 0 | 0 |

78

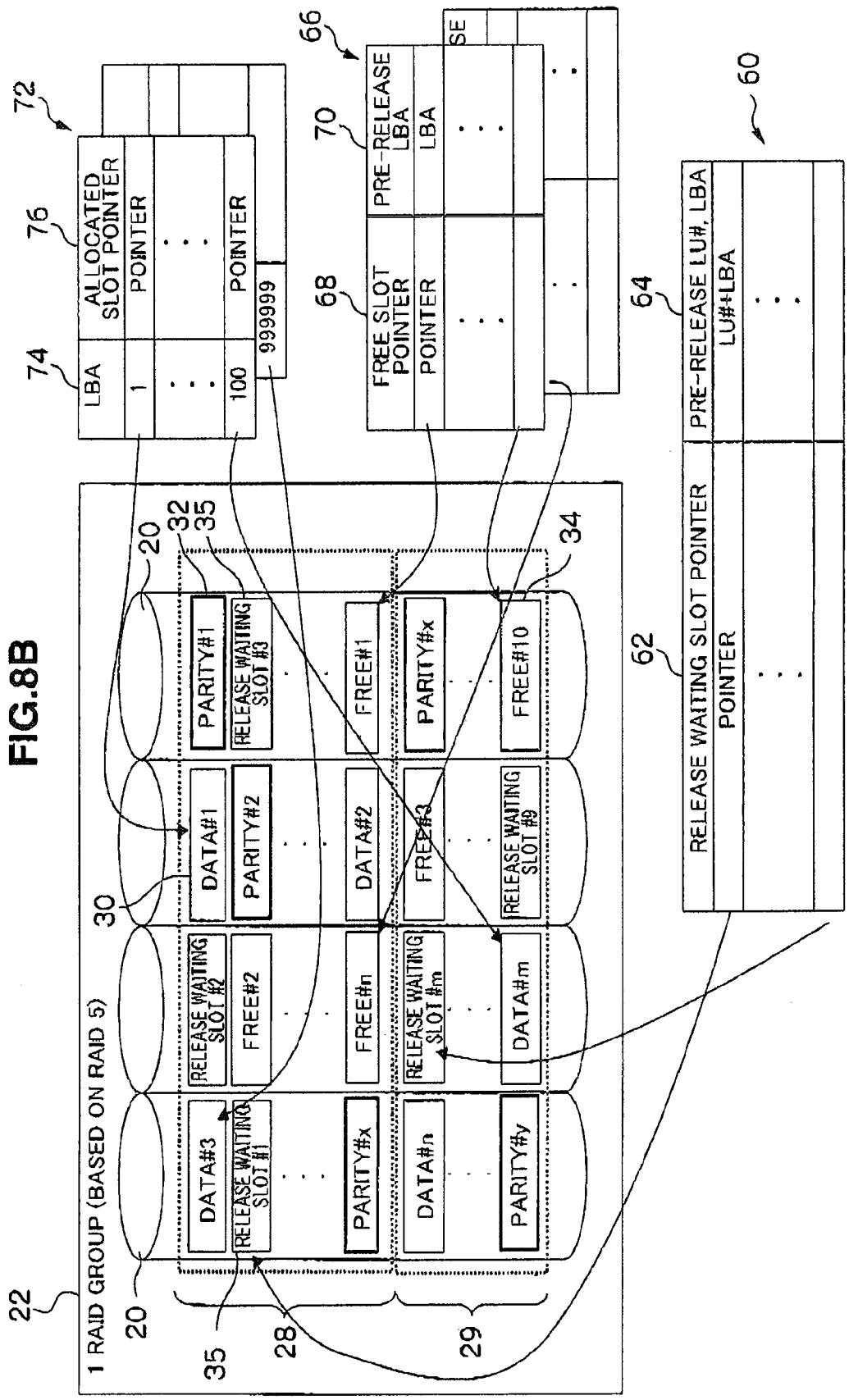

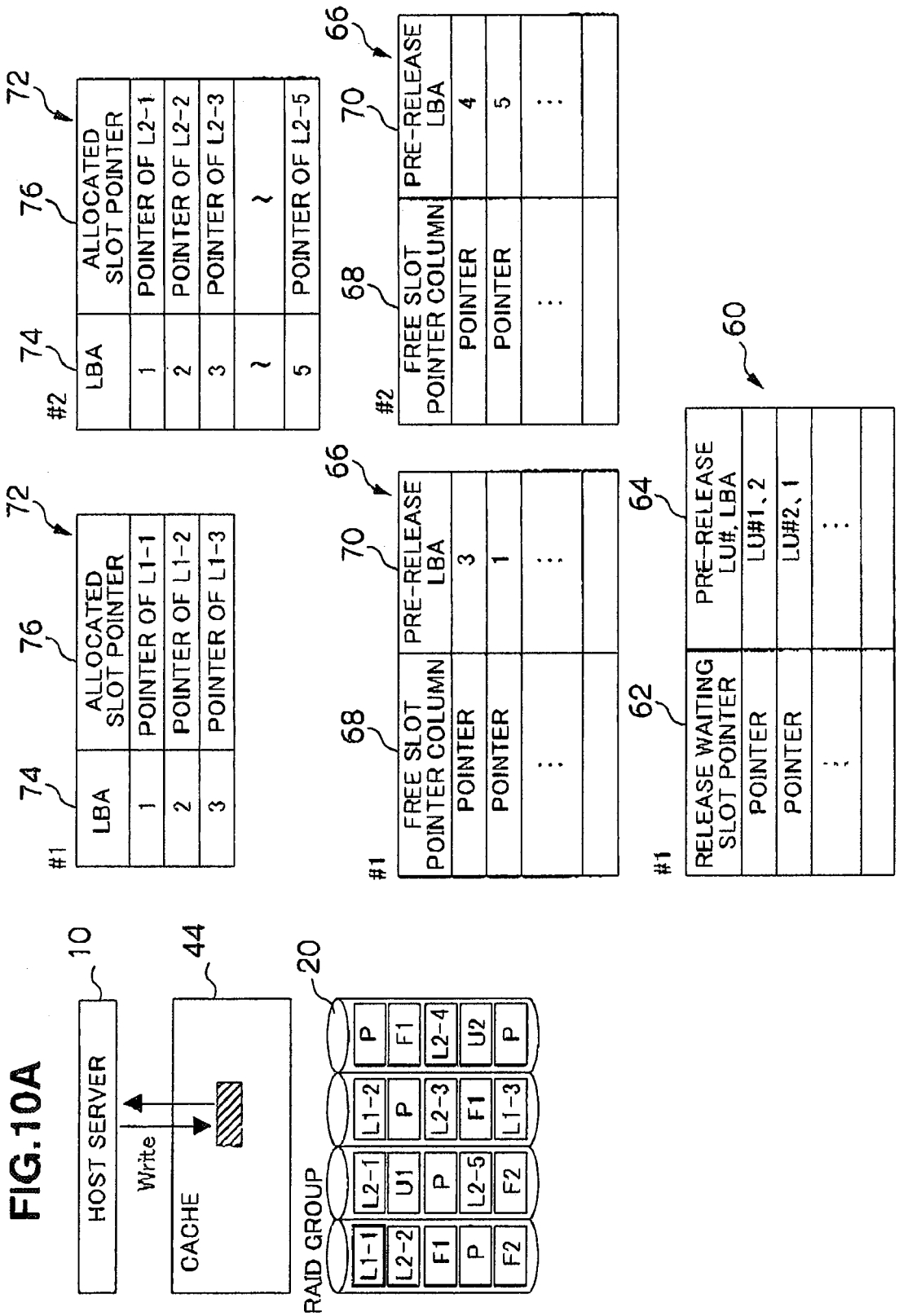

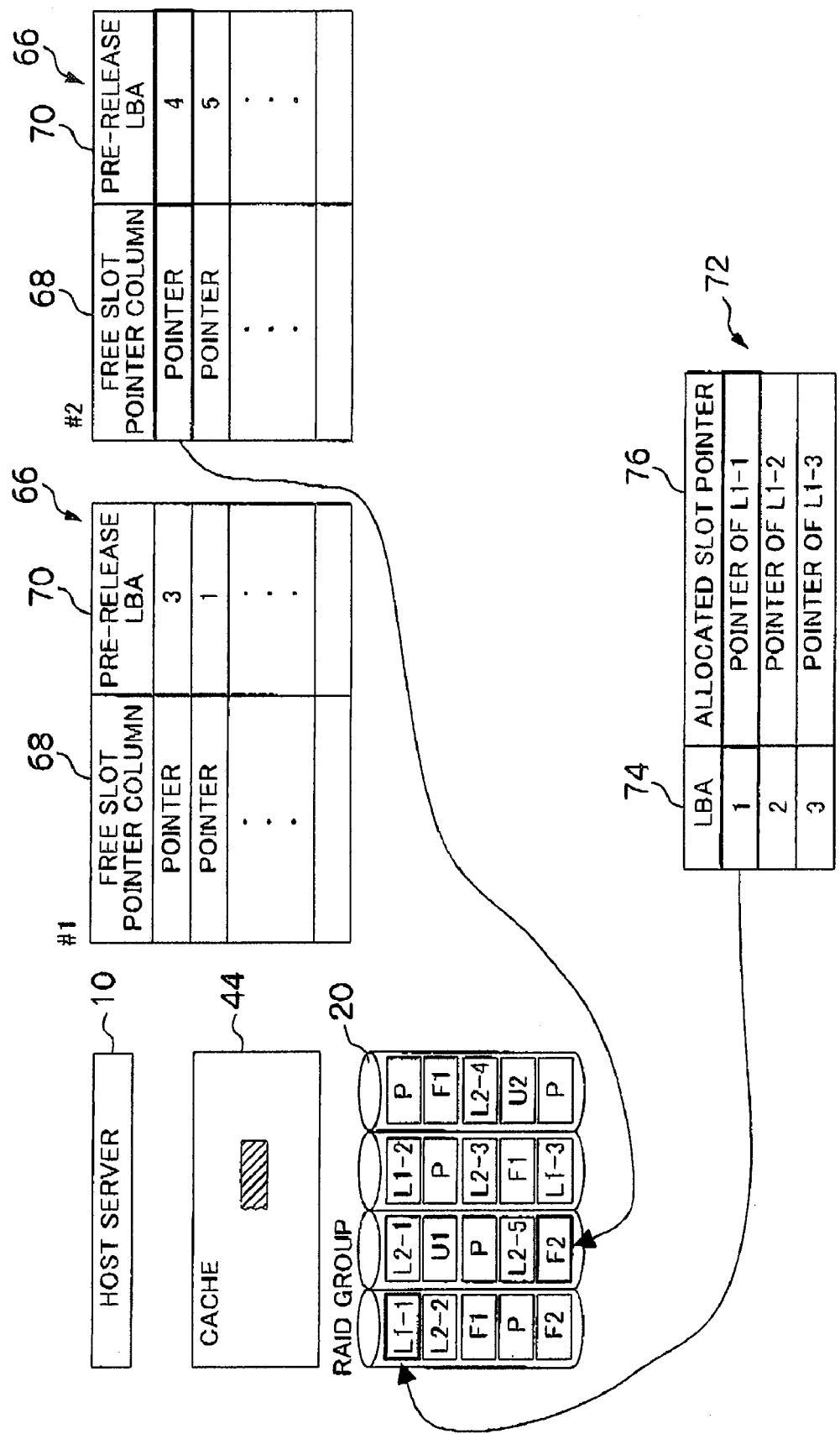

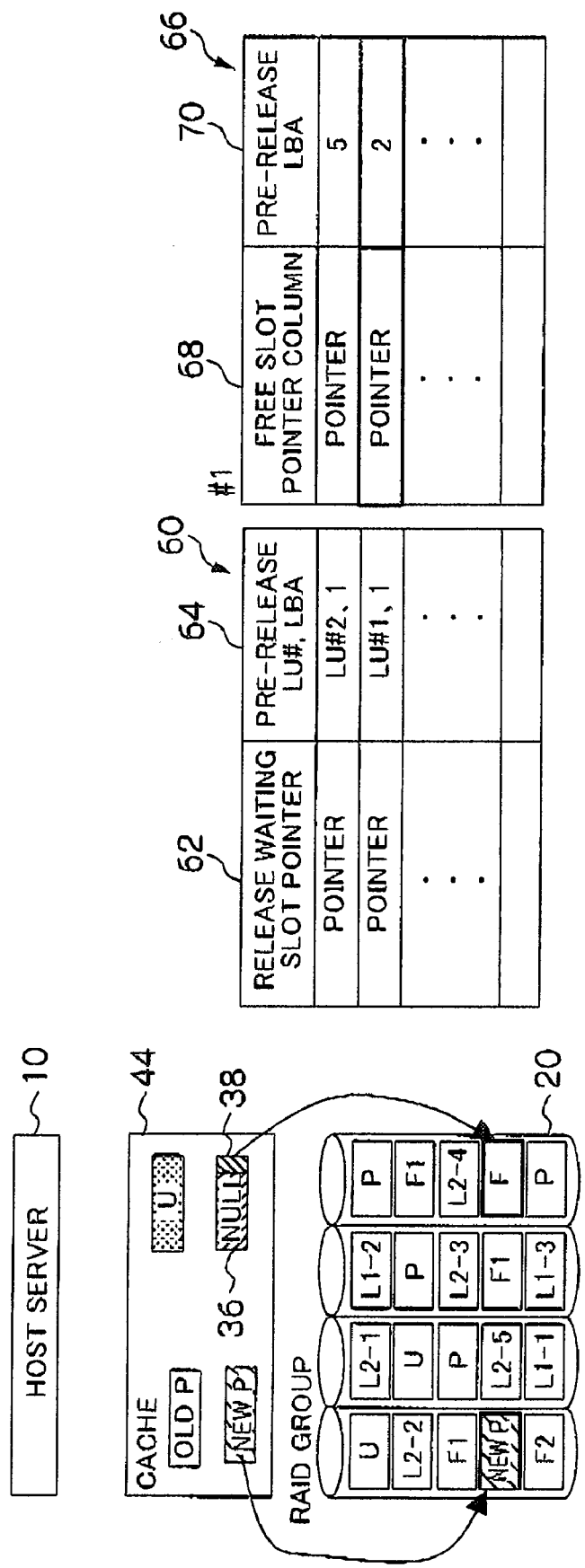

FIG.18

| LBA | ALLOCATED SLOT POINTER | |
|---|---|---|
| | HDD# | ADDRESS |
| 1 | HDD#1 | 000001 |
| 2 | HDD#2 | 000100 |
| ⋮ | ⋮ | ⋮ |
| nnnnnnnn | HDD#4 | 100000 |

| HDD# | AVERAGE FREE SLOT COUNT | FREE SLOT | RELEASE WAITING COUNT | RATIO |
|---|---|---|---|---|
| HDD#1 | 10 | 3 | 8 | 1.1 |
| HDD#2 | 10 | 4 | 6 | 1 |
| HDD#3 | 10 | 1 | 12 | 1.3 |
| HDD#4 | 10 | 5 | 1 | 0.6 |

| PHYSICAL ADDRESS | PRE-RELEASE LU#, LBA |
|---|---|
| ADDRESS | LU#xx, nnnnnn |
| ADDRESS | LU#xx, mmmmm |
| ⋮ | ⋮ |

116

STORAGE APPARATUS

CROSS-REFERENCES

This application relates to and claims priority from Japanese Patent Application No. 2008-144683, filed on Jun. 2, 2008, the entire disclosure of which is incorporated herein by reference.

BACKGROUND

The present invention generally relates to a storage apparatus, and in particular relates to a disk array device that uses inexpensive disks.

In recent years, so-called disk array devices in which a plurality of hard disk devices are managed and operated in RAID (Redundant Array of Inexpensive Disks) format are being widely used as the storage apparatus for storing data in corporations and government offices.

Prices of disk array devices have been lowered in recent years, and inexpensive SATA (Serial AT Attachment) disks are being used instead of fibre channel disks as the hard disk device pursuant to such price reduction.

Although SATA disks are inexpensive, they are also unreliable. Thus, for instance, if a hard disk drive storing information in which the reliability heeds to be ensured such as system information required for operating the disk array device is simply replaced from A fibre channel disk to a SATA disk, the reliability of the overall disk array device will deteriorate.

In light of the above, Japanese Patent Laid-Open Publication No. 2006-72435 (Patent Document 1) proposes a method of determining whether write data has been normally stored in a storage unit. Specifically, this method includes the steps of commanding a storage unit to store, in response to a request from a host, a first check code based on write data in a cache memory, write the write data attached to the first check code in a prescribed storage area, and read the data stored in the prescribed storage area A second check code is created based on the read data and, if the correspondence relationship of the first and second check codes is correct, it is determined that the write data has been normally stored in the storage unit.

SUMMARY

Upon writing data into a hard disk drive (HDD), since the method described in Patent Document 1 uses so-called RAW (Read After Write) technology which writes data stored in a cache memory into the hard disk drive (HDD), and thereafter compares the data read from the hard disk drive and the data stored in the cache memory to check whether the data coincide, it is possible to secure the reliability of data.

Nevertheless, if RAW technology is used to check the data upon writing data into a hard disk drive, the time required to check the data will become an overhead, and the performance of the hard disk drive cannot be exhibited fully.

Thus, an object of the present invention is to provide a disk array device capable of guaranteeing that correct information is stored in a storage unit without depending on RAW technology.

In order to achieve the foregoing object, the present invention, without performing RAW technology during the writing of data write, writes data and identifying information of such data in a backup storage area that is different from the data storage area designated in the request from the host system, thereafter zero-clears the pre-update storage destination data asynchronously with the request from the host system, reads the data identifying information from the data storage destination designated in the request from the host system during the reading of data, and verifies whether the data to be written was actually written based on the read data identifying information so as to ensure the reliability of data.

According to the present invention, it is possible to reduce the overhead during the writing of data and guarantee the reliability of data in a storage unit without depending on RAW technology.

DESCRIPTION OF DRAWINGS

FIG. 2 is a diagram explaining a data logical form in a free slot;

FIG. 3 is a diagram explaining a data logical form in a slot during write processing;

FIG. 4 is a configuration diagram of a release waiting queue;

FIG. 5 is a configuration diagram of a free queue;

FIG. 6 is a configuration diagram of an LU management table;

FIG. 7 is a configuration diagram of a correction read counter table;

FIG. 8A and FIG. 8B are diagrams explaining a data placement example in a RAID group;

FIG. 10A and FIG. 10B are diagrams explaining the allocation method of an HDD slot during [data] writing;

FIG. 16A to FIG. 16C are diagrams explaining the status of the slot release processing;

FIG. 18 is a configuration diagram of an LU management table;

FIG. 19 is a configuration diagram of an HDD allocation management table;

FIG. 20 is a configuration diagram of a free queue;

DETAILED DESCRIPTION

An embodiment of the present invention is now explained with reference to the attached drawings.

First Embodiment

In this embodiment, an LU (Logical Unit) as a data area recognized by a host system (server) is allocated as an arbitrary address in the HDD (Hard Disk Drive) having a RAID configuration, data is written by dynamically allocating a new storage area (backup storage area) that is different from the data storage area each time data is written into the HDD, and data identifying information for identifying the data is written as additional information. During the reading of data from the HDD, if the read data identifying information and the read area designated by the host system coincide, this is processed as correct data. If the read data identifying information and the read area designated by the host system do not coincide, data is recovered based on correction read since the written data is deemed to be bad data.

(Configuration of Storage System in First Embodiment)

Figure 1:
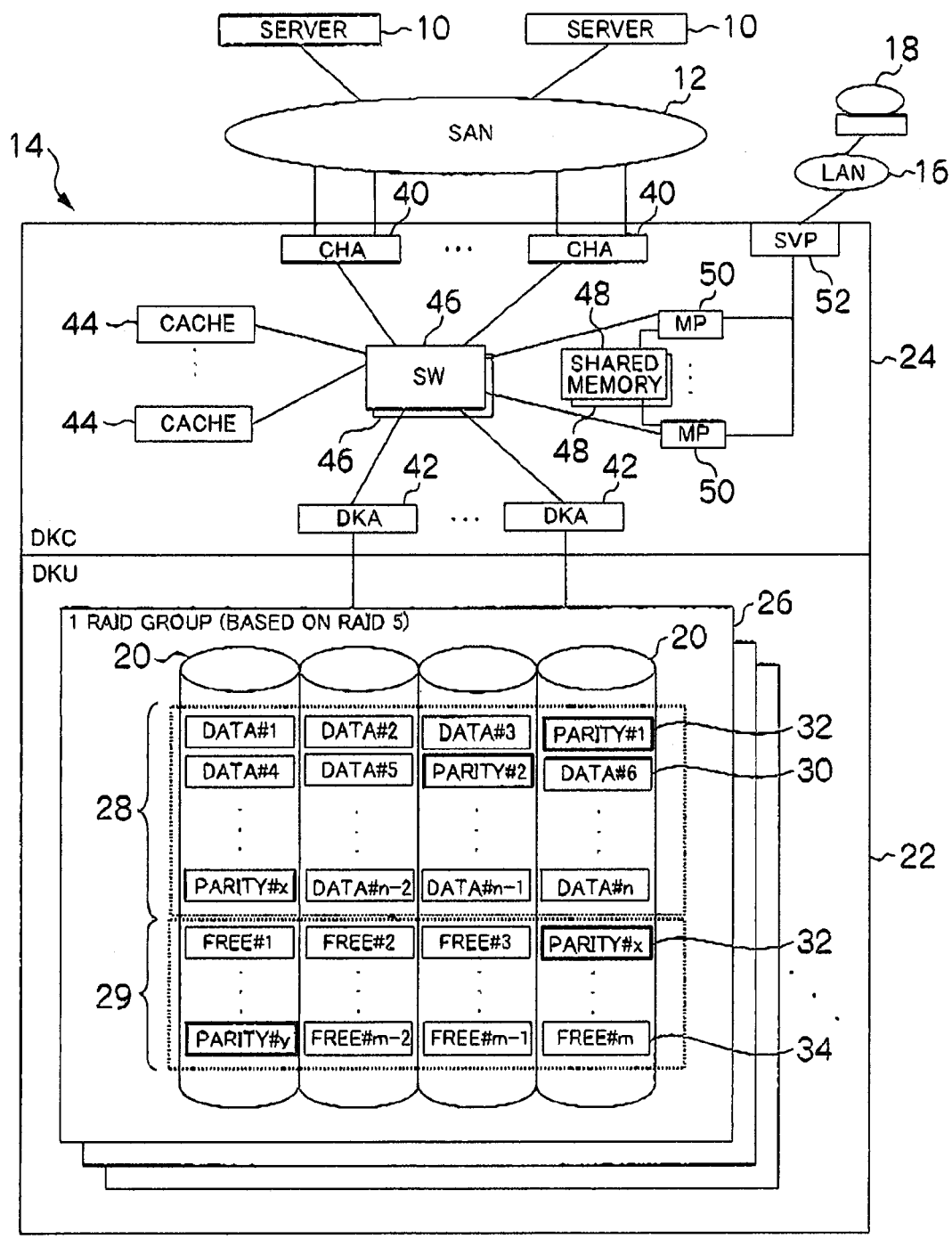
FIG. 1 is a block configuration diagram of a storage system using a disk array device.

FIG. 1 is a block configuration diagram of a storage system in the first embodiment. In FIG. 1, the storage system comprises a plurality of servers (host servers) 10 as the host system or host, a disk array device 14 for sending and receiving information to and from the respective servers 10 via a communication network 12, and a management terminal 18 for sending and receiving information to and from the disk array device 14 via a communication network 16.

Each server 10 is a computer device comprising information processing resources such as a CPU (Central Processing Unit) and a memory, and is configured from a personal computer, a workstation, a mainframe or the like. Each server 10 also comprises an information input device (not shown) such as a keyboard, a switch, a pointing device, or a microphone, and an information output device (not shown) such as a monitor display or a speaker.

The communication networks 12, 16 are configured from a SAN (Storage Area Network), a LAN (Local Area Network), Internet, a public line, a dedicated line or the like. Communication between each server 10 and the disk array device 14 is conducted according to a fibre channel protocol if the network 12 is a SAN, and communication between the disk array device 14 and the management terminal 18 is conducted according to a TCP/IP (Transmission Control Protocol/Internet Protocol) protocol if the network 16 is a LAN.

The disk array device 14 comprises a disk unit 22 configured from a group of HDDs 20, and a disk controller (disk control unit) 24 for controlling each HDD 20 of the disk unit 22. The disk unit 22 comprises a plurality of HDDs 20 configuring a RAID group 5 as a storage unit, and the respective HDDs 20 are distributively housed in a plurality of chassis 26.

A RAID group is a group in which one or more HDDs 20 are defined as a group having a redundant configuration such as a RAID configuration. All or a part of the storage areas of the one or more HDDs 20 configuring one RAID group is defined as one or more logical units LU. Data from the server 10 is stored in the logical unit LU in units of logical blocks of a prescribed size. A unique identification number (LUN) is assigned to each logical unit LU. The input and output of data uses a combination of this identification number (LUN) and a logical block address (LBA), which is number that is unique to the logical block assigned to each logical block, as the address.

The storage area of each HDD 20 is set by being divided into a basic area 28 and an overflow area 29 during the initial LU allocation. Data slots 30 of #1 to #n and parity slots 32 of #1 to #n are arranged as the smallest stripe units in the basic area 28 evenly in each HDD 20. Free slots 34 of #1 to #n and parity slots 32 of #1 to #n are arranged in the overflow area 30 evenly in each HDD 20.

The data slots 30 and the parity slots 32 configure a data storage area for storing data, and the free slots 34 are slots to be dynamically allocated as a data storage destination that is different from the data slots 30 during the writing of data, and configure a backup storage area to become a migration destination of the data stored in the data slots 30.

Here, before the free slots 34 are allocated, as shown in FIG. 2, NULL (zero) is stored in the data storage area 36 of the free slot 34, and NULL (zero) is stored as additional information in the additional information storage area 38.

Meanwhile, when the free slots 34 are dynamically allocated, as shown in FIG. 3, update data as with the data stored in the data slot 30 is stored in the data storage area 36 of the free slot 34, and an LU# and LBA (Logical Block Address) are stored as data identifying information for identifying the data stored in the free slot 34 is stored in the additional information storage area 38.

Specifically, although the free slot 34 functions as a backup storage area before being dynamically allocated during the writing of data, it is allocated during the writing of data, and functions as a data storage area (data slot 30) when data and data identifying information are stored therein. To put it differently, although the affiliation of the free slot 34 before being dynamically allocated during the writing of data is the backup storage area, the affiliation is changed to the data storage area when it is dynamically allocated during the writing of data and data and data identifying information are stored therein.

Meanwhile, during the writing of data, one of the data slots 30 is designated as the data storage destination in the access request (write access) from the server 10. Nevertheless, since the data slot 30 is not allocated to the data storage destination and the free slot 34 is dynamically allocated as the data storage destination, the pre-update data stored in the data slot 30 designated in the access request will become old data.

Thus, NULL (zero) is stored in the data storage area 36 of the data slot 30 designated in the access request, NULL (zero) is stored in the additional information storage area 38, and the data slot 30 designated in the access request is reused as a free slot 34. In other words, although the affiliation of the data slot 30 before it is designated in the access request (write access) is the data storage area, after it is designated in the access request (write access), its affiliation is changed to the backup storage area.

The disk controller 24 comprises a plurality of channel adapters (CHA) 40, a plurality of disk adapters (DKA) 42, a plurality of cache memories 44, a plurality of switches 46, a plurality of shared memories 48, a plurality of microprocessors (Micro Processing Units) 50, and a service processor (SVP) 52.

Each channel adapter 40 is configured as a microcomputer system comprising an initiator port and a target port as ports for conducting data communication with each server 10, as well as a CPU and a memory, and interprets and executes various commands received from each server 10. Each channel adapter 40 is allocated with a network address for identifying each channel adapter 40, and each channel adapter 40 is able to function independently as a NAS (Network Attached Storage). Each channel adapter 40 may also individually receive and process the requests from each server 10.

Each disk adapter 42 sends and receives data to and from the HDD 20 retained in the disk unit 22. Each disk adapter 42 is also configured as a microcomputer system comprising a CPU and a memory as with the channel adapter 40, and performs write access or read access to the designated HDD 20.

Here, each disk adapter 42 performs data access according to the RAID configuration since the HDD 20 is configured in a RAID group 5. For instance, each disk adapter 42 writes the same data in separate HDD groups 20, or executes parity calculation and writes data and parity in the HDD group 20.

Each cache memory 44 is used for temporarily storing data received from the respective servers 10 or data read from the HDD 20.

The switch 46 is used for mutually connecting the respective channel adapters 40, the respective disk adapters 42, the respective cache memories 44 and the respective microprocessors 50. The switch 46 may be configured from a high-speed bus such as an ultra high-speed crossbar switch for performing data transmission by way of high-speed switching.

The shared memory 48 stores various types of control information and configuration information to be used for controlling the operation of the disk array device 14, and, as described later, information concerning a release waiting queue, a free queue, an LU management table, and a correction read counter table.

Each microprocessor 50 is used for controlling the operation of the overall disk array device 14 based on information stored in the shared memory 48.

The service processor 52 is connected to each microprocessor 50, and connected to the management terminal 18 via the network 16. The service processor 52 collects various types of information in the disk array device 14, and outputs such information to the management terminal 18 via the network 16. The service processor 52 may rewrite the configuration information stored in the shared memory 48 according to a command from the management terminal 18, and thereby change the configuration of the disk array device 14.

FIG. 4 shows the configuration of a release waiting queue 60. The release waiting queue 60 is used for managing data (pre-updated data) stored in the data slot 30 designated in the access request from the server 10 as zero clear candidate data or NULL clear (zero clear) waiting data. The release waiting queue 60 is configured from a release waiting slot pointer column 62 and a pre-release LU#, LBA (Logical Block Address) column 64, and is used in RAID group units. The release waiting slot pointer column 62 stores the HDD# and address according to a pointer (information showing the physical HDD and the address of the data stored in the HDD), and the pre-release LU#, LBA column 64 stores the LU# and LBA (data storage address) of the pre-release data slot 30 as the pre-release data identifying information.

FIG. 5 shows the configuration of a free queue 66. The free queue 66 is used for managing the free slots 34 to be dynamically allocated as the new data storage destination during the writing of data. The free queue 66 is configured from a free slot pointer column 68 and a pre-release LBA column 70, and is used in LU units. The free slot pointer column 68 stores the HDD# and address according to a pointer, and the pre-release LBA column 66 stores the LBA (data storage address) of the pre-release data slot 30.

FIG. 6 shows the configuration of an LU management table 72. The LU management table 72 is a table for managing the data slots 30, and is used in LU units. The LU management table 32 is configured from an LBA column 74 and an allocated slot pointer column 76. The LBA column 74 stores 1 to nnnnnnnn, and the allocated slot pointer column 76 stores the HDD# and address as the pointer.

FIG. 7 shows the configuration of a correction read (READ) counter table 78. The correction read counter table 78 is used for recording and managing the correction read count for each HDD#1 to #4 configuring the RAID group. The correction read counter table 78 is configured from a RAID group column 80, an HDD#1 column 82, an HDD#2 column 84, an HDD#3 column 86, and an HDD#4 column 88. The RAID group column 80 stores 1-1 to X-Y, and the HDD#1 column 82 to the HDD#4 column 88 respectively store the numerical value regarding the correction read count.

Figure 8A:
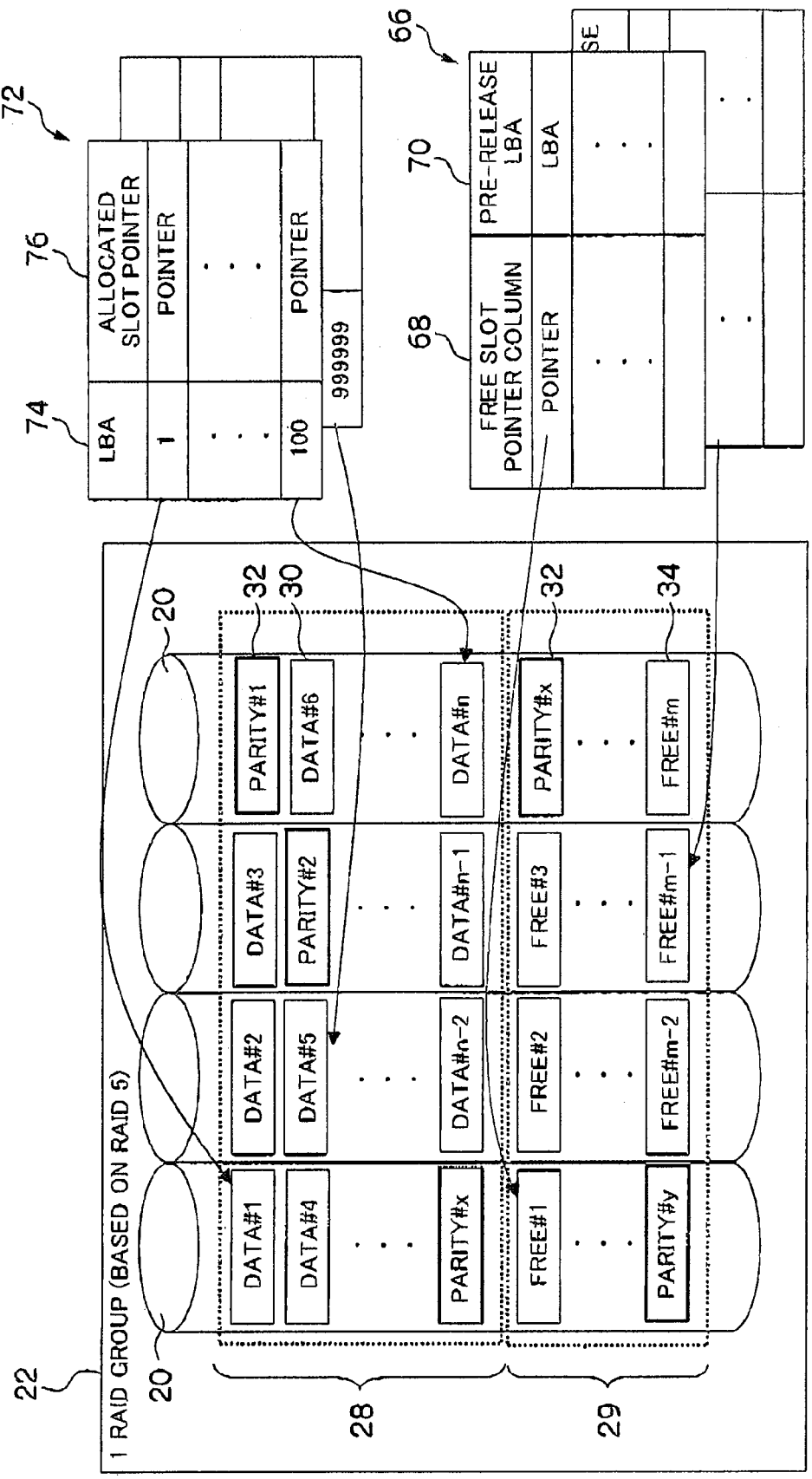

An example of data placement in the RAID group is now explained with reference to FIG. 8; namely, an example during HDD formatting is shown in FIG. 8A and an example during usage is shown in FIG. 8B.

In FIG. 8A, data in which the pointer in the LU management table 72 is 1 corresponds to the #1 data slot 30, and data in which the pointer is 100 corresponds to the #n data slot 30. Moreover, data in which the pointer in the free queue 66 is 1 corresponds to the #1 free slot 34.

In FIG. 8B, the pointer 1 in the LU management table 72 corresponds to the #1 data slot 30, the pointer 100 corresponds to the #m data slot 30, the pointer 1 in the free queue 66 corresponds to the #1 free slot 34, and the pointer 1 in the release waiting queue 62 corresponds to the #1 release waiting slot 35.

Figure 9:
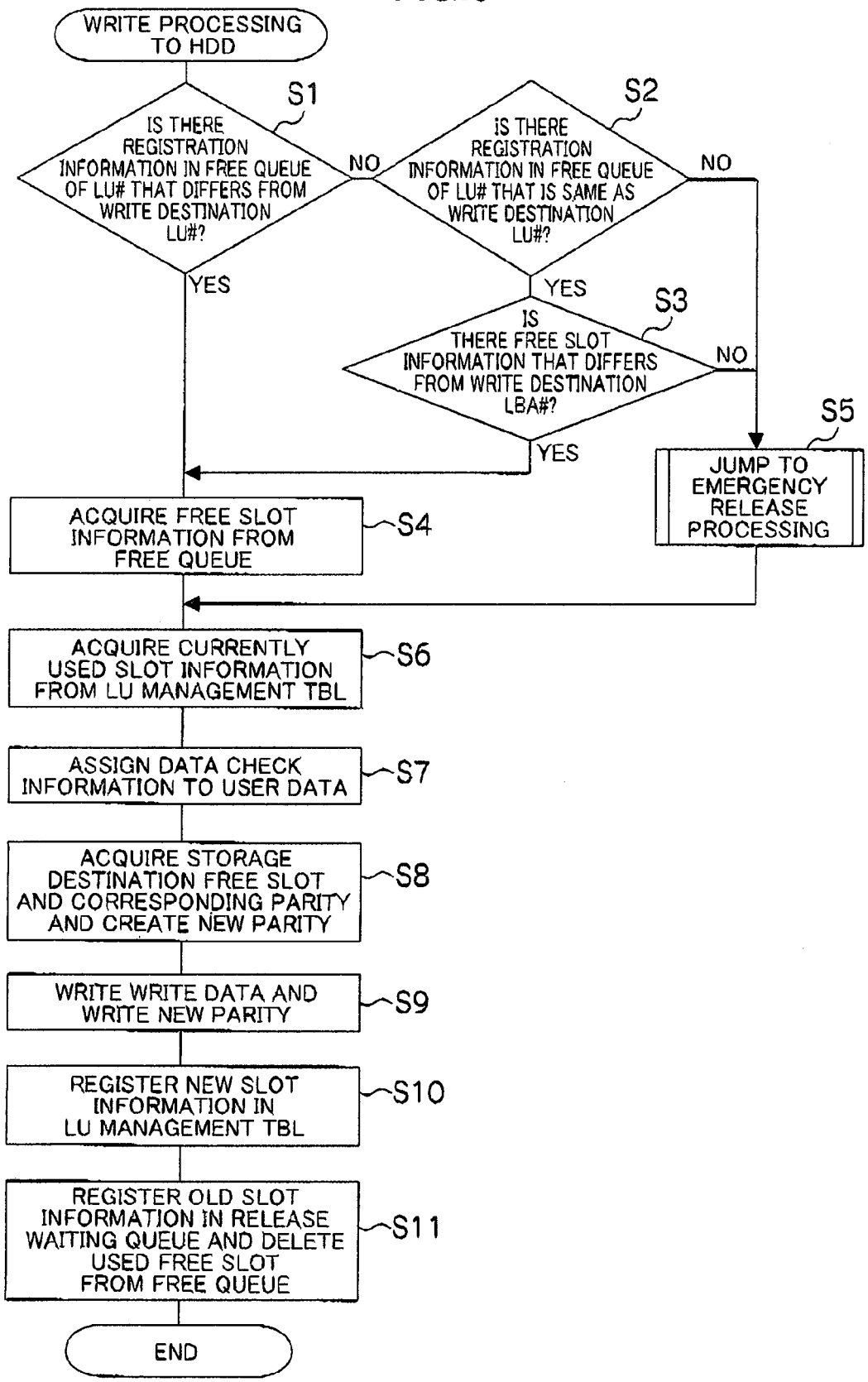
FIG. 9 is a flowchart explaining the write processing of writing data into an HDD.

The write processing of writing data into the HDD is now explained with reference to the flowchart shown in FIG. 9. When the writing of data (write access) into the HDD 20 is requested as the access request from the server 10, the microprocessor 50 starts the processing for once storing the data (user data) from the server 10 in the cache memory 44, and then writing the data stored in the cache memory 44 into the HDD 20.

Foremost, the microprocessor 50 interprets the access request from the server 10, searches for a free queue 66 of each LU, and determines whether there is registration information in a free queue 66 of an LU# that is different from the write destination (data storage destination) LU# designated in the access request (S1). Here, if it is determined that there is no registration information, the microprocessor 50 determines whether there is registration information in a free queue 66 of the same LU# as the write destination LU# (S2). Here, if it is determined that there is registration information, the microprocessor 50 determines whether there is free slot information that is different from the write destination LBA# (S3). Here, if the microprocessor 50 obtains a positive result in this determination or obtains a positive result in the determination at step S1, it acquires free slot information from the free queue 66 (S4).

Meanwhile, it the microprocessor 50 obtains a negative result in the determination at both steps S2 and S3, it jumps to the emergency release processing (S5), and proceeds to step S6.

Here, if there is a write access from the server 10 to an LBA=1 of LU#1, the microprocessor 50 writes the user data in the cache 44, and returns a message to such effect to the server 10. As the status in this case, the configuration of the LU#1 management table 72, the LU#2 management table 72, the LU#1 free queue 66, the LU#2 free queue 66, and the LU#1 release waiting queue 60 is shown in FIG. 10A.

As the status when free slot information is acquired from a free queue 66 having an LU# that is different from the LU# designated in the access request from the server 10, the configuration of the HDD 20 when pre-write slot information is acquired from the LU#1 management table 72, and the configuration of the LU#1 free queue 66 and LU#2 free queue 66 are shown in FIG. 10B. Specifically, a pointer is acquired from the top address of the LU#2 free queue 66 having an LU# that is different from LU#1, and F2 is set to be a free slot 34.

The microprocessor 50 subsequently acquires currently used slot information from the LU management table 72 (S6), assigns LU# and LBA, which are data identifying information for identifying the user data, as additional information for checking data to the user data stored in the cache memory 44

Figure 11A:
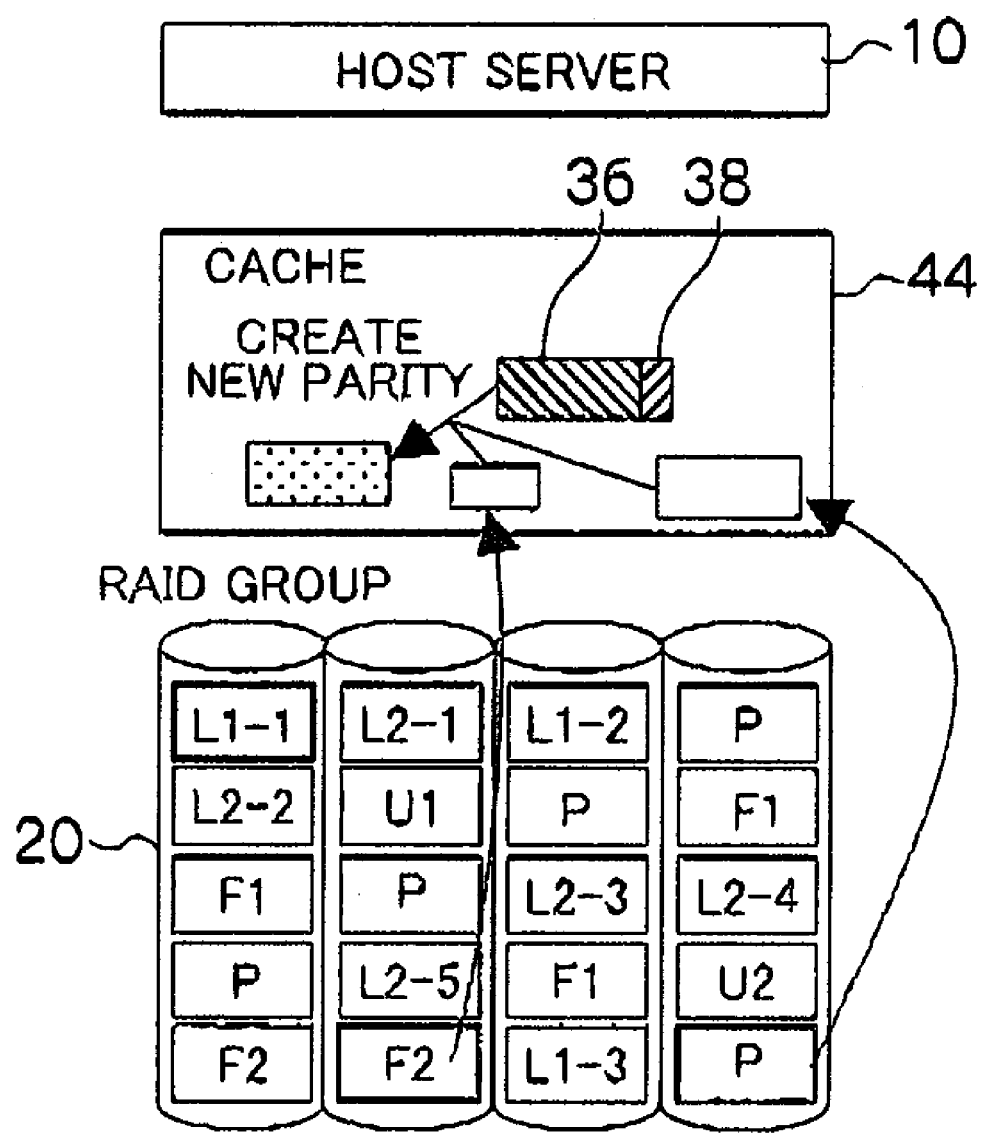
FIG. 11A and FIG. 11B are diagrams explaining the allocation method of an HDD slot during data writing.

(S7), writes the free slot 34 and the parity corresponding to such free slot 34 into the cache memory 44, assigns additional information for checking data to the write data, and thereafter, creates new parity (S8). The status of the HDD 20 and the cache memory 44 in this case is shown in FIG. 11A.

Subsequently, the microprocessor 50 writes write data and the new parity in the free slot 34 dynamically allocated as the new data storage destination in the HDD 20 (S9), and registers new slot information for setting the free slot 34 of the new data storage destination as the data slot 30 in the LU management table 72 (S10).

Subsequently, the microprocessor 50 registers the data slot 30 designated in the access request from the server 10 as old slot information in the release waiting queue 60 as the preprocessing for NULL-clearing the data of the data slot 30 designated in the access request from the server 10 as old data, deletes the used free slot 34 from the free queue 66 (S11), and thereby ends this processing routine.

Figure 11B:
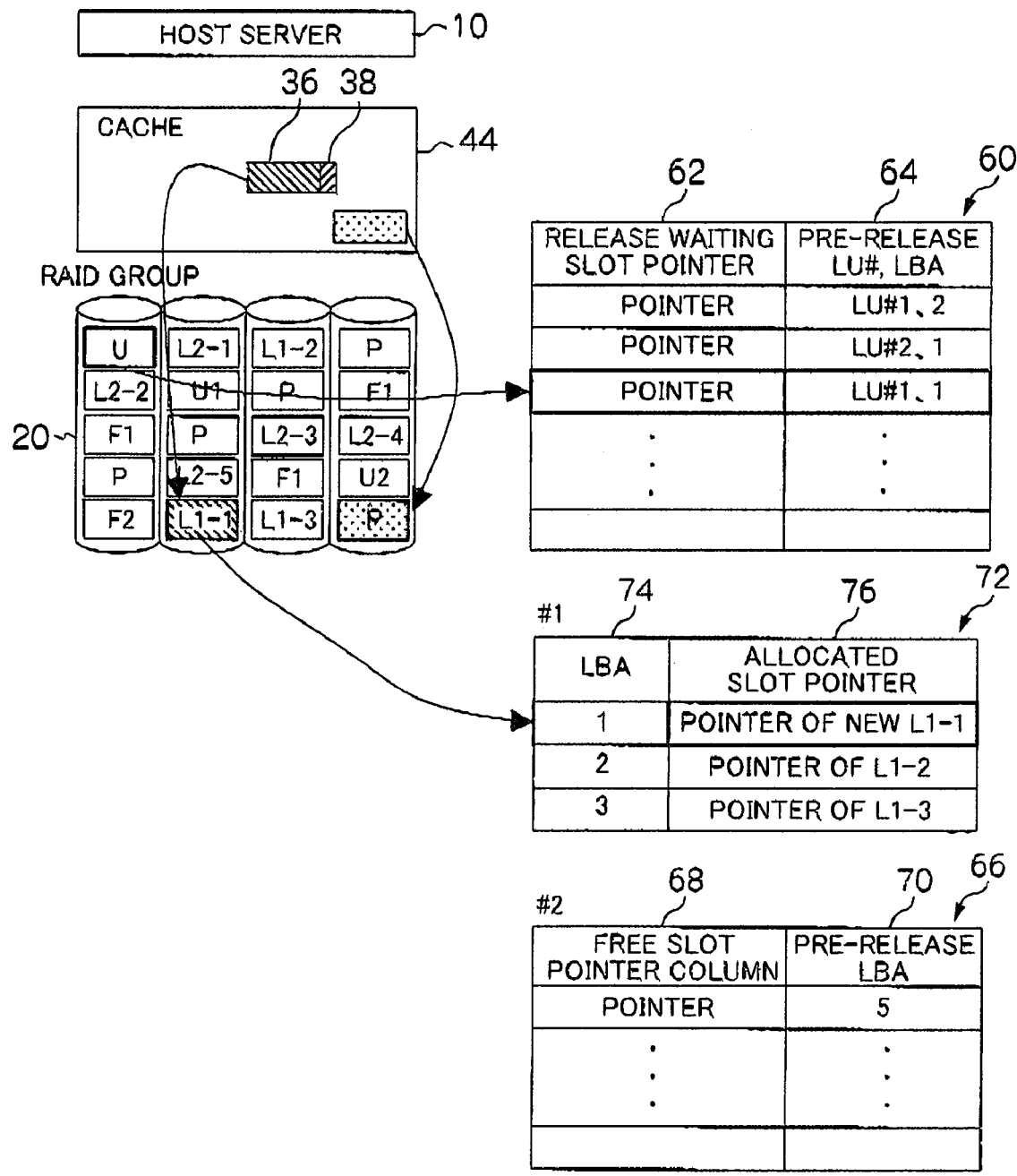

The status of the HDD 20 and the cache memory 44 after writing the write data and new parity into the HDD 20 and registering the information of the used data slot 30 in the release waiting queue 60, and the status of the release queue 60, the LU#1 management table 72, and the LU#2 free queue 66 are shown in FIG. 11B. In other words, write data as the update data is written into the free slot 34 of F2, this slot is registered as the data slot 30 of LU#1, LBA#1 in the top address of the LU#1 management table 72, the data slot 30 of LU#1, LBA#1 designated in the access request from the server 10 is registered as the release waiting slot 35 in the release waiting queue 60, and the pointer corresponding to the free slot 34 of F2 is deleted from the LU#2 free queue 66. Incidentally, the data of the release waiting slot 35 registered in the release waiting queue 60 is zero-cleared in the slot release processing.

Based on the foregoing processing, a free slot 34 that is different from the write destination LU# or LBA# can be dynamically allocated as the data storage destination, and user data and data identifying information (LU#, LBA#) for identifying the user data can be stored in the allocated free slot 34. During the writing of data, the performance of the HDD 20 can be educed since it is not necessary to check the data.

Figure 12:
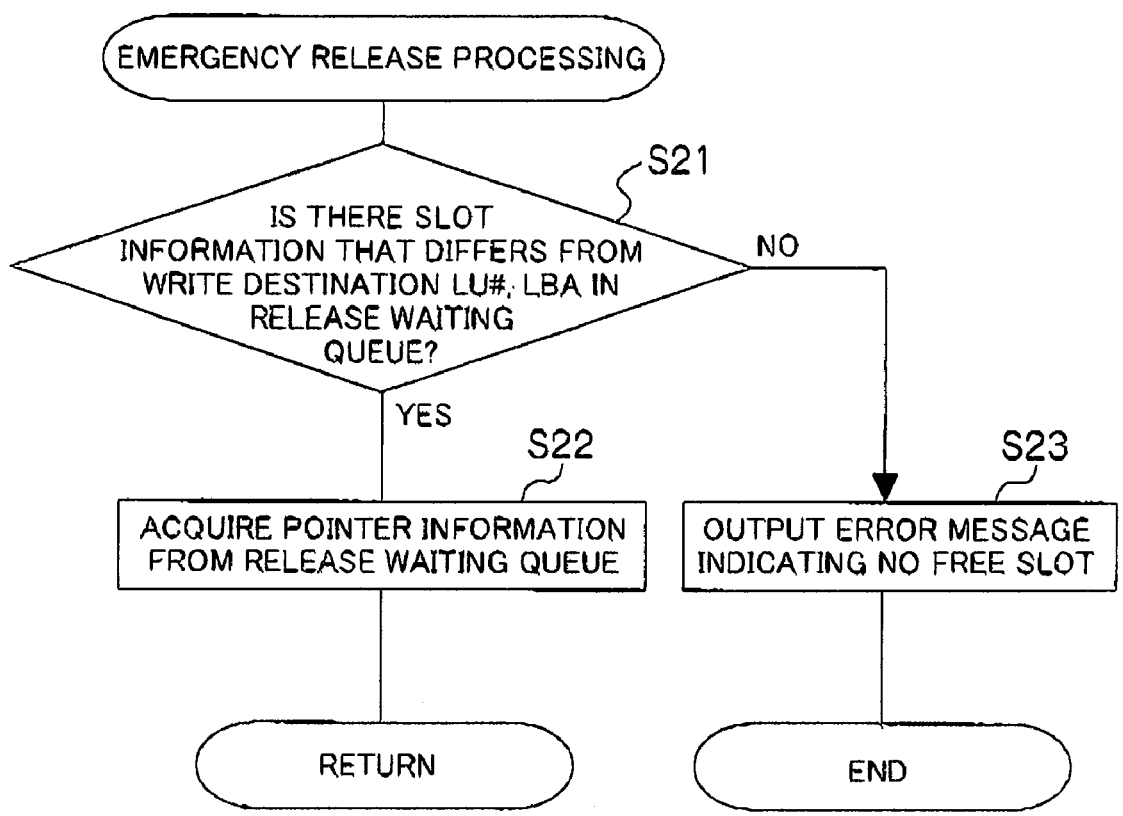
FIG. 12 is a flowchart explaining the release waiting slot emergency release processing.

The release waiting slot emergency release processing is now explained with reference to the flowchart shown in FIG. 12. When there is a shortage of free slots 34, the microprocessor 50 determines whether there is slot information that is different from the write destination LU#, LBA designated in the access request from the server 10 in the release waiting queue 60 (S21), acquires pointer information from the release waiting queue 60 upon obtaining a positive result in this determination (S22), sets the slot obtained from the acquired pointer information as a free slot 34, and then proceeds to step S6 of FIG. 9.

Meanwhile, if the [micro]processor 50 obtains a negative result in the determination at step S21, it outputs an error message indicating that there is no free slot 34 (S23), and then ends this processing routine.

Figure 13:
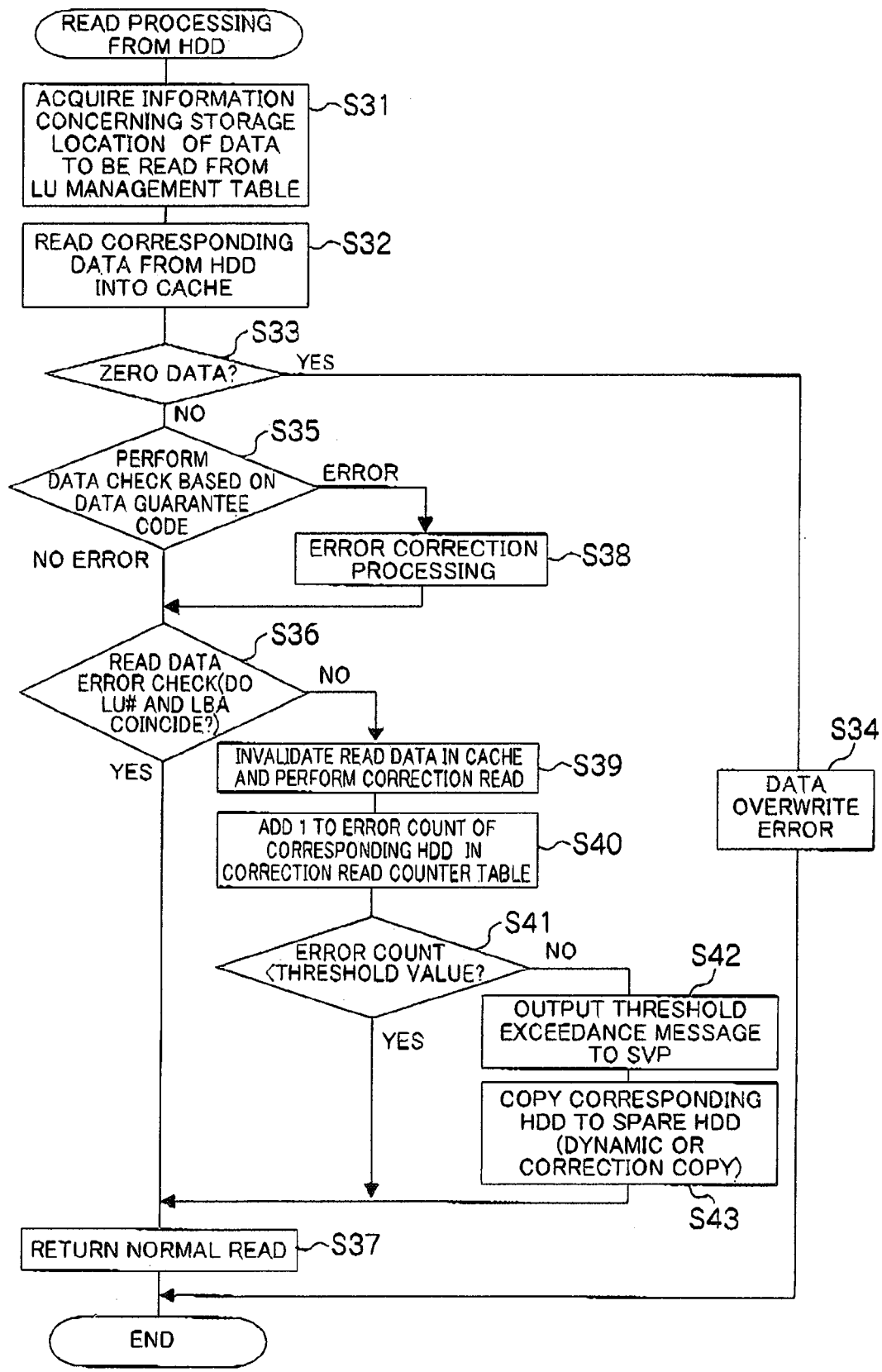
FIG. 13 is a flowchart explaining the read processing of reading data from an HDD.

The read processing of reading data from the HDD is now explained with reference to the flowchart shown in FIG. 13. Upon receiving a read access to the HDD 20 as the access request from the server 10, the microprocessor 50 acquires information such as a pointer concerning the data storage destination from which data is to be read from the LU management table 72 if there is no corresponding data in the cache memory 44 prior to performing read access to the HDD 20 (S31), and reads the corresponding data and its data identifying information from the data slot 30 of the HDD 20 into the cache memory 44 based on the acquired information (S32).

Figure 14A:
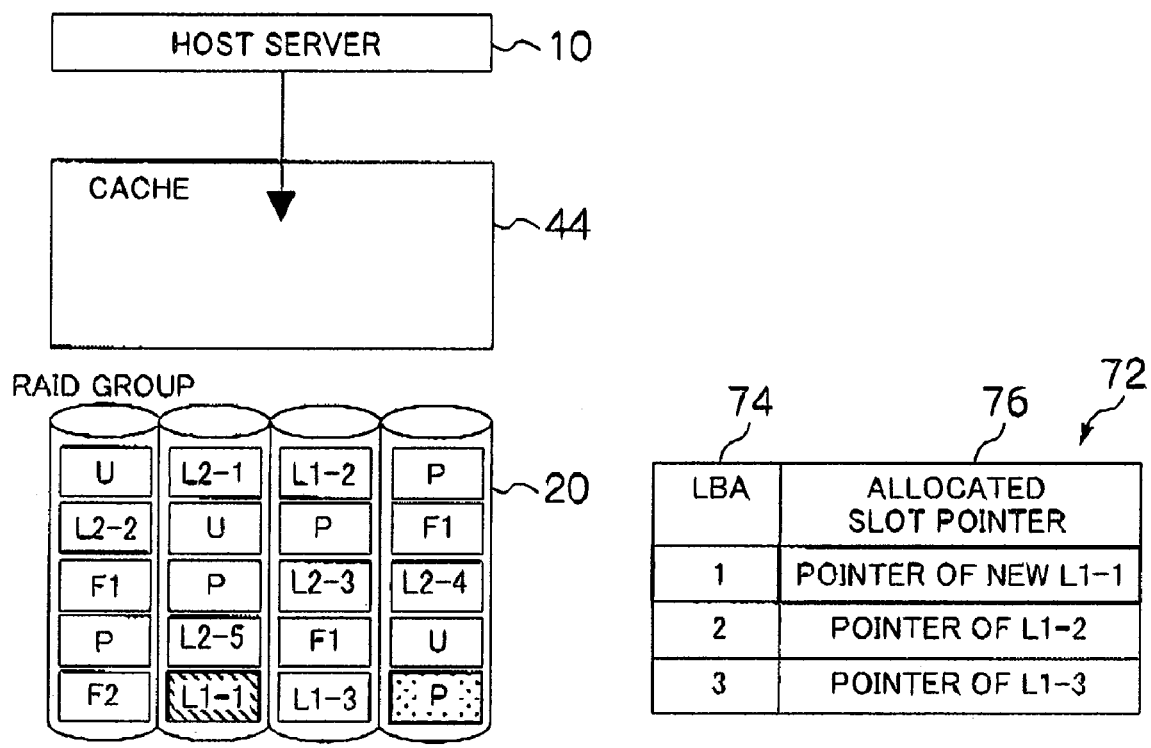
FIG. 14A to FIG. 14C are diagrams explaining the status upon reading data from an HDD slot.

Here, as an example when a request for reading data of LU#1, LBA=1 is issued from the server 10, the status of the cache memory 44 and the HDD 20, and the configuration of the LU#1 management table 72 are shown in FIG. 14A. In other words, if pointer information of the LU#1 management table 72 is acquired and data of LU#1, LBA=1 does not exist in the cache memory 44, data is read from the data slot 30 of LU#1, LBA=1 in the HDD 20.

Subsequently, the microprocessor 50 determines whether the data read into the cache memory 44 is 0 data (S33). If the microprocessor 50 determines this to be 0 data, it outputs a message to the effect that the overwriting of data was unsuccessful to the server 10 and the management terminal 18 (S34), and then ends this processing routine.

Meanwhile, if the microprocessor 50 determines that the data read into the cache memory 44 is not 0 data, it performs a data check (CRC check) based on a data guarantee code in order to check the inconsistency of data. If the microprocessor 50 determines that there is no error, it determines whether the LU# and LBA coincide as the error check of read data (S36).

At step S36, in order to determine whether the zero clear was successful or unsuccessful, the microprocessor 50 determines whether the LU# designated in the read request from the server 10 and the LU# read from the HDD 20 coincide, and additionally determines whether the LBA designated in the read request of the server 10 and the LBA read from the HDD 20 coincide.

Figure 14B:
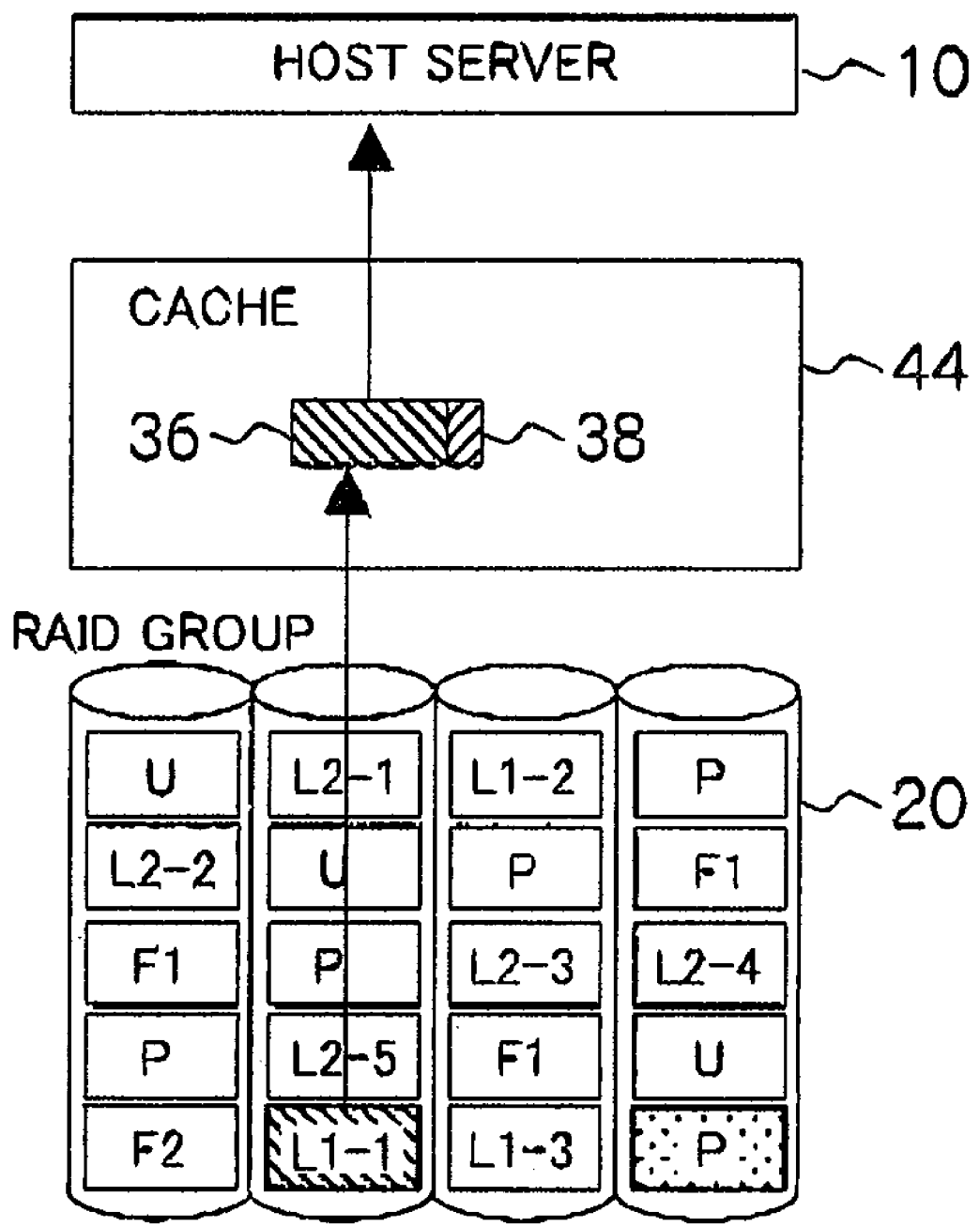

At step S36, if the microprocessor 50 determines that the contents coincide, it deems that the previous write processing was successful and sends the read data to the server 10 (S37). Here, the microprocessor 50 returns only data with the additional information (data identifying information) removed therefrom to the server 10. The status in this case is shown in FIG. 14B.

Meanwhile, if the microprocessor 50 determines that there is an error at step S35, it executes the error correction processing, and proceeds to the processing at [step] S36 (S38).

Moreover, if the microprocessor 50 determines that the contents do not coincide at step S36, it invalidates the read data in the cache memory 44 and performs correction read (S39), adds +1 to the error count of the corresponding HDD# in the correction read counter table 78 (S40), and determines whether the error count is smaller than the threshold value (S41). If the error count is smaller than the threshold value, the microprocessor 50 proceeds to the processing at step S37, and, if the error count is greater than the threshold value, outputs a message to the effect that the error count exceeded the threshold value to the service processor 52 (S42).

Subsequently, the microprocessor 50 copies the HDD 20 in which the error count exceeded the threshold value to a spare HDD by way of dynamic or correction copy (S43), thereafter proceeds to the processing at step S37, performs the processing at step S37, and then ends this processing routine.

Figure 14C:
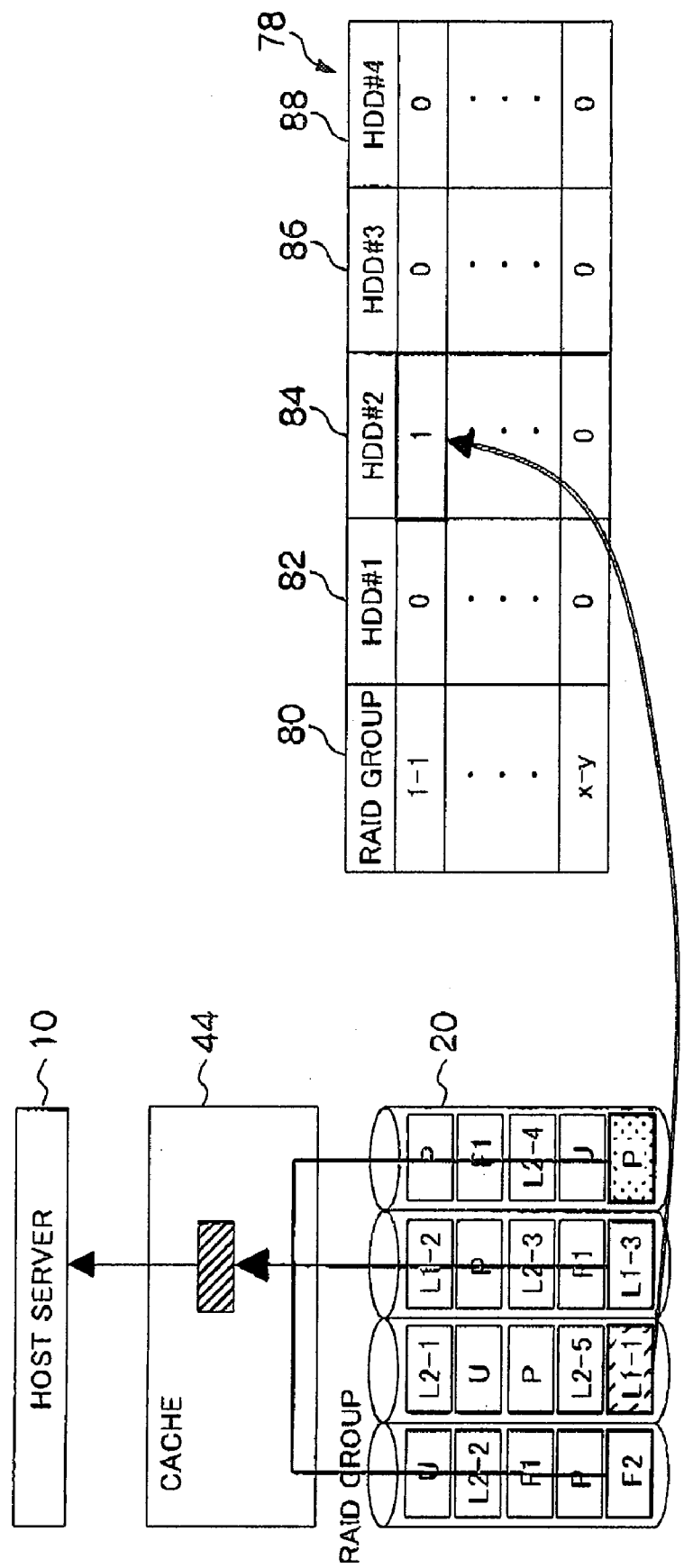

Here, the status of the cache 44 and the HDD 20 and the status of the correction read counter table 78 in a case where the LU# and LBA are different and data is stored in by way of correction read, and normal read data is returned to the server 10 are shown in FIG. 14C. In other words, in substitute for the data of the data slot 30 of LU#1, LBA=1, data is recovered using information of the free slot 34 of F2 and data of LU#1, LBA=3 and parity P of the parity slot 32, and the recovered data is transferred to the server 10.

Based on the foregoing processing, during the reading of data, it is possible to discover bad data (data overwrite failure) by checking the coincidence of the LU# and LBA as the additional information (data identifying information)

assigned during the writing of data and the LU# and LBA designated in the read access from the server 10, and recover the correct data by way of correction read.

Figure 15:
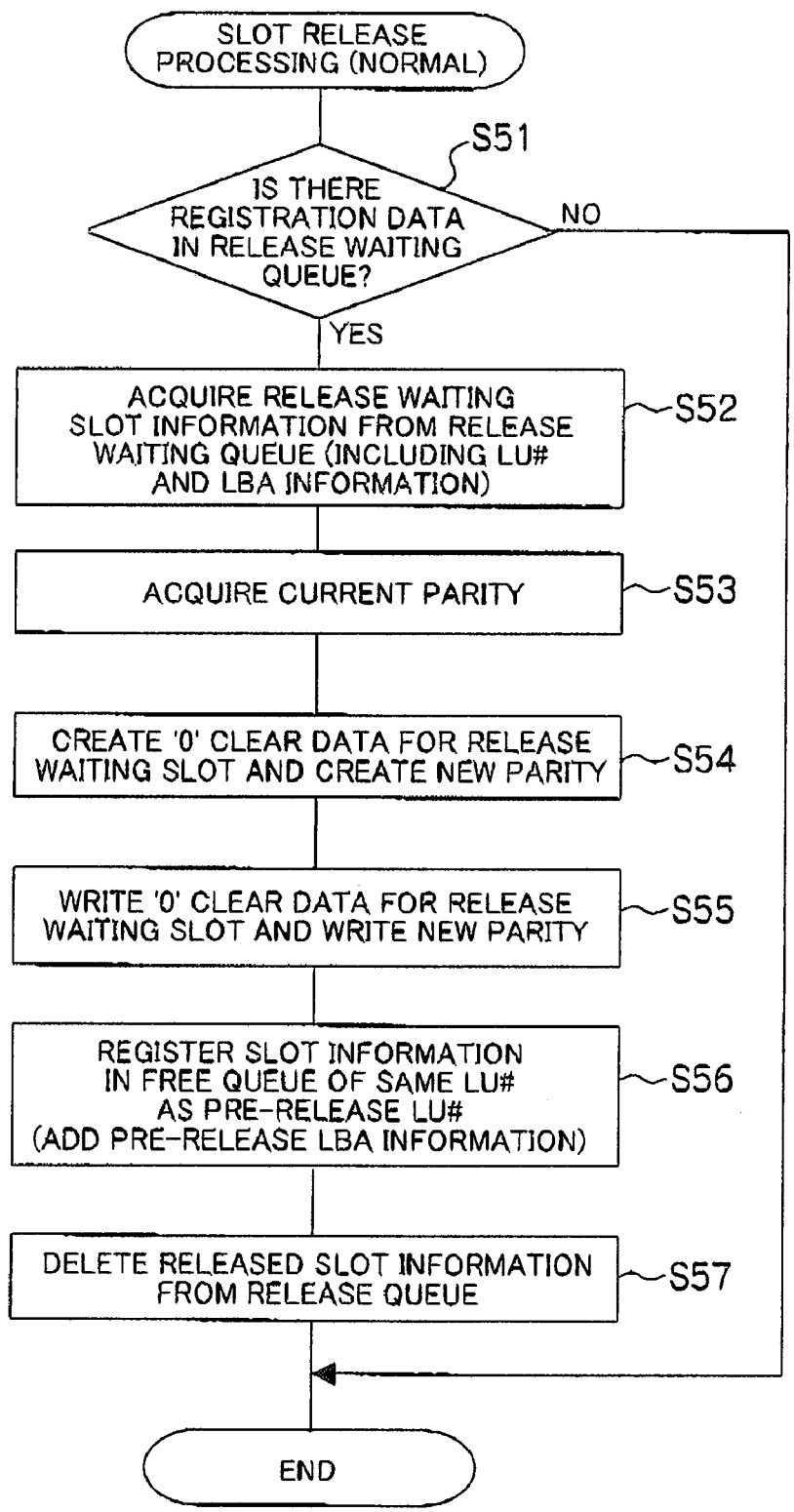
FIG. 15 is a flowchart explaining the slot release processing.
Figure 16A:
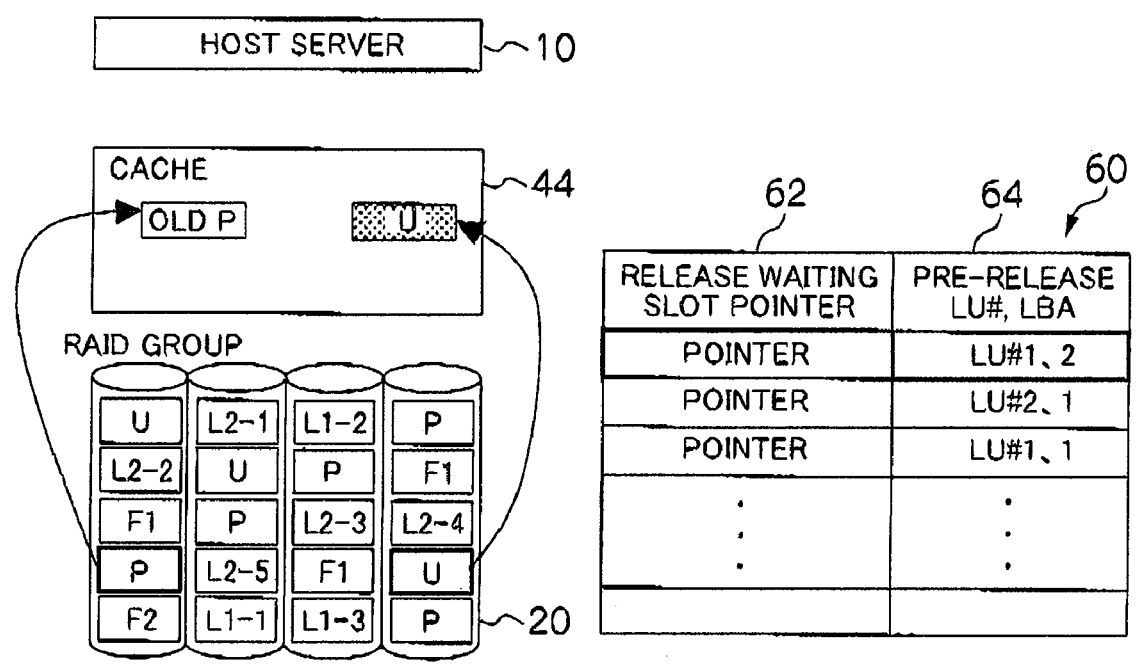

The release processing is now explained with reference to the flowchart shown in FIG. 15. The microprocessor 50 searches for a release waiting queue 60 and determines whether there is registration data (S51). If there is no registration data, the microprocessor 50 ends this processing routine. Contrarily, if the microprocessor 50 determines that there is registration data, it acquires the pointer of the release waiting slot 35 and information concerning the pre-release LU#, LBA from the release waiting queue 60 (S52), and reads the information and parity of that release waiting slot 35 into the cache memory 44 (S52). The status of the cache memory 44 and the HDD 20 and the status of the release [waiting] queue 60 in this case are shown in FIG. 16A.

Figure 16B:
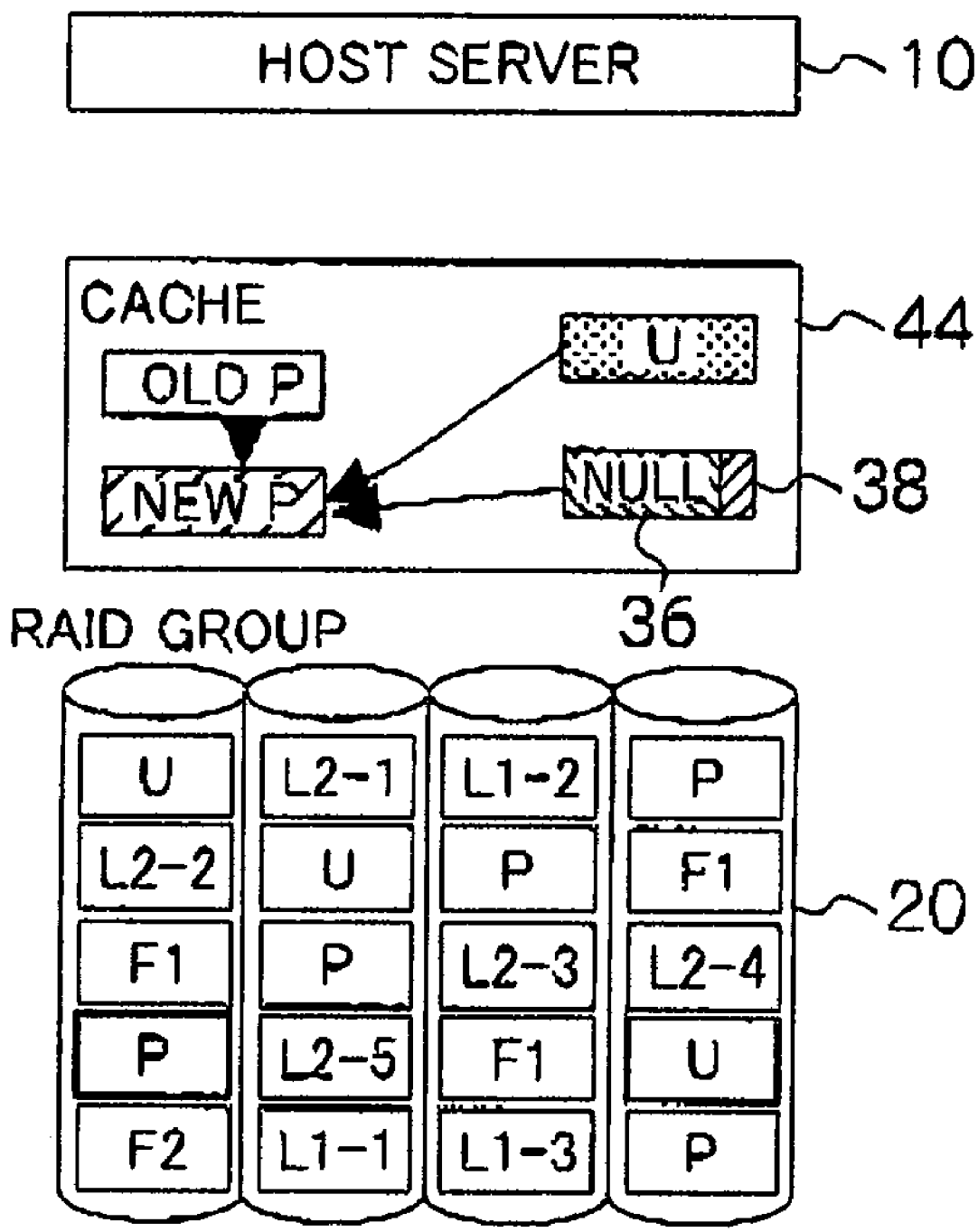

Subsequently, the microprocessor 50 acquires the current parity (S53), creates old data of the release waiting slot 35 in which the data and all areas concerning LU#, LBA were NULL-cleared (zero-cleared) in the cache memory 44, and creates new parity based on the old data and parity and the NULL data (S54). The status of the cache memory 44 and the HDD 20 in this case is shown in FIG. 16B.

Subsequently, the microprocessor 50 writes the NULL data (zero clear data) and the new parity in the release waiting slot 35 (S55), performs processing to the free queue 66 of the same LU# as the pre-release LU# for registering slot information for changing the release waiting slot 35 to a free slot 34; that is, processing for adding pre-release LBA information (S56), deletes the slot information concerning the release waiting slot 35 that was released from the release waiting queue 60 (S57), and then ends this processing routine.

The status of the HDD and the configuration of the release waiting queue 60 and the LU# free queue 66 when the NULL data and new parity area written into the release waiting slot 35 are shown in FIG. 16C. In other words, the LU#1, 2 at the top address of the pointer are deleted from the release waiting queue 60, and the pre-release LBA of the second pointer of the LU#1 free queue 66 is set to 2.

Based on the foregoing processing, since the release waiting slot 35 registered in the release waiting queue 60 is changed to a free slot 34 and thereafter managed in the free queue 66, consequently, it is possible to guarantee that the free slot 34 designated as the data write destination area is zero-cleared before the writing of data.

By zero-clearing the data slot 30 storing pre-update data (old data), the data slot 30 can be reused as a free slot 34. In addition, since zero clear can be implemented asynchronously with the access request from the server 10, the release waiting queue 60 and the free queue 66 can be used to manage the free slot 34 to become the new data storage destination.

According to the present embodiment, it is possible to reduce the overhead during the writing of data and guarantee the reliability of data in a storage unit without depending on RAW technology, as well as guarantee the reliability of data in the HDD 20 without compressing the area of the cache memory 44.

Meanwhile, when performing write processing to the HDD 20, it is also possible to consider a case of retaining write data in the cache memory 44 until the subsequent read and comparing the data read from the HDD 20 and the data in the cache memory 44 at the time of the subsequent read, but with this method, although it is possible to reduce the overhead of write processing, write pending data before the reception of the read request from the server 10 will be retained, and this will compress the area of the cache memory 44.

Meanwhile, with the present embodiment, in order to use the area of the cache memory 44 without waste and reducing the overhead for performing data check, old data is zero-cleared after performing write processing to an area (free slot 34) that is different from the old data, and this compared with the zero data during the reading of data.

Second Embodiment

Figure 17:
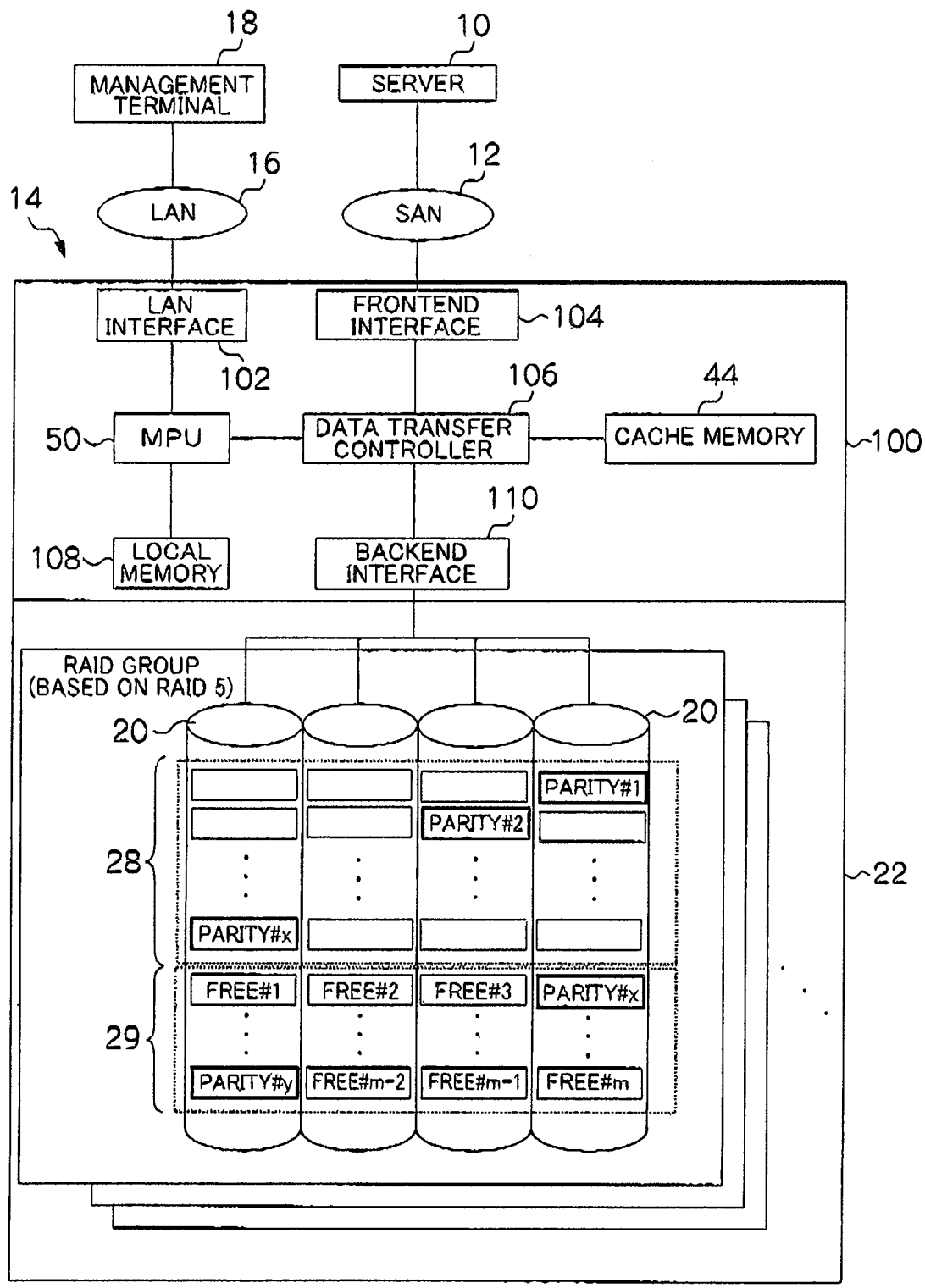
FIG. 17 is a block configuration diagram of a storage system in the second embodiment.

The second embodiment of the present invention is now explained with reference to FIG. 17. In this embodiment, a disk controller 100 is used in substitute for the disk controller 24 as the disk array device 14, and the remaining configuration is the same as the first embodiment.

The disk controller 100 comprises one microprocessor 50 and a single cache memory 44 as a disk control unit, and further comprises a LAN interface 102, a frontend interface 104, a data transfer controller 106, a local memory 108, and a backend interface 110. The LAN interface 102 comprises the same functions as the service processor 52, and the frontend interface 104 comprises the same functions as the channel adapter 40.

The data transfer controller 106 is connected to the frontend interface 104, the microprocessor 50, the cache memory 44, and the backend interface 110 in order to control the transfer of data in the disk controller 100.

The backend interface 110 comprises the same functions as the disk adapter 42, and is connected to each HDD 20. The local memory 108 stores programs to be executed by the microprocessor 50. The cache memory 44 stores the configuration information stored in the shared memory 48 of FIG. 1, as well as information concerning the release waiting queue 60, the free queue 66, the LU management table 72, and the correction read counter table 78.

The disk array device 14 in this embodiment is applied to a mini RAID and, as with the first embodiment, the free slot 34 can be dynamically allocated as a data storage destination during the writing of data into the HDD 20, and user data as well as data identifying information for identifying such user data can be stored in the free slot 34. Moreover, during the reading of data, data read from the HDD 20 is written into the cache memory 44, and contents of the read access from the server 10 and the contents of the data read from the HDD 20 are compared in the cache memory 44. If the contents coincide, this can be sent to the server 10 as correct data, and, if the contents do not coincide, data can be recovered by way of correction read.

According to the present embodiment, even when using a mini RAID, it is possible to reduce the overhead during the writing of data and guarantee that correct information is stored in the HDD 20 as the storage unit without depending on RAW technology, as well as guarantee the reliability of data in the HDD 20 without compressing the area of the cache memory 44.

Third Embodiment

The third embodiment of the present invention is now explained. In this embodiment, the free slots 34 as the new data storage destination are evenly distributed to each HDD, and, as the tables or queues to be stored in the cache memory 44, this embodiment comprises an LU management table 112 shown in FIG. 18, an HDD allocation management table 114 shown in FIG. 19, and a free queue 116 shown in FIG. 20.

The LU management table 112 is configured from an LBA column 118 and an allocated slot pointer column 120, and is used in LU units. The LBA column 118 stores 1, 2, . . . , nnnnnnnn, and the allocated slot pointer column 120 associates and stores the HDD# and address.

The HDD allocation management table 114 is configured from an HDD# column 122, an average free slot count column 124, a free slot column 126, a release waiting count column 128, and a ratio column 130, and is used in correspondence with a RAID group.

The HDD# column 122 stores HDD#1 to #4, the average free slot count column 124 stores the average number of free slots, the free slot column 126 stores the number of free slots, the release waiting count column 128 stores the number of release waiting slots 35 to waiting to be released, and the ratio column 130 stores the numerical value of the ratio of free slots and release waiting slots in relation to the average free slot count. Incidentally, the average free slot count is calculated during the initial allocation of the LU, and the calculated value is set in the average free slot count column 124.

The free queue 116 is configured from a physical address column 132, and a pre-release LU#, LBA column 134, and is used in HD units of the RAID group #. The physical address column 132 stores the physical address of the HDD 20, and the pre-release LU#, LBA column 134 stores nnnnnnnn, mmmmm as the pre-release LU#xx and LBA.

Figure 21:
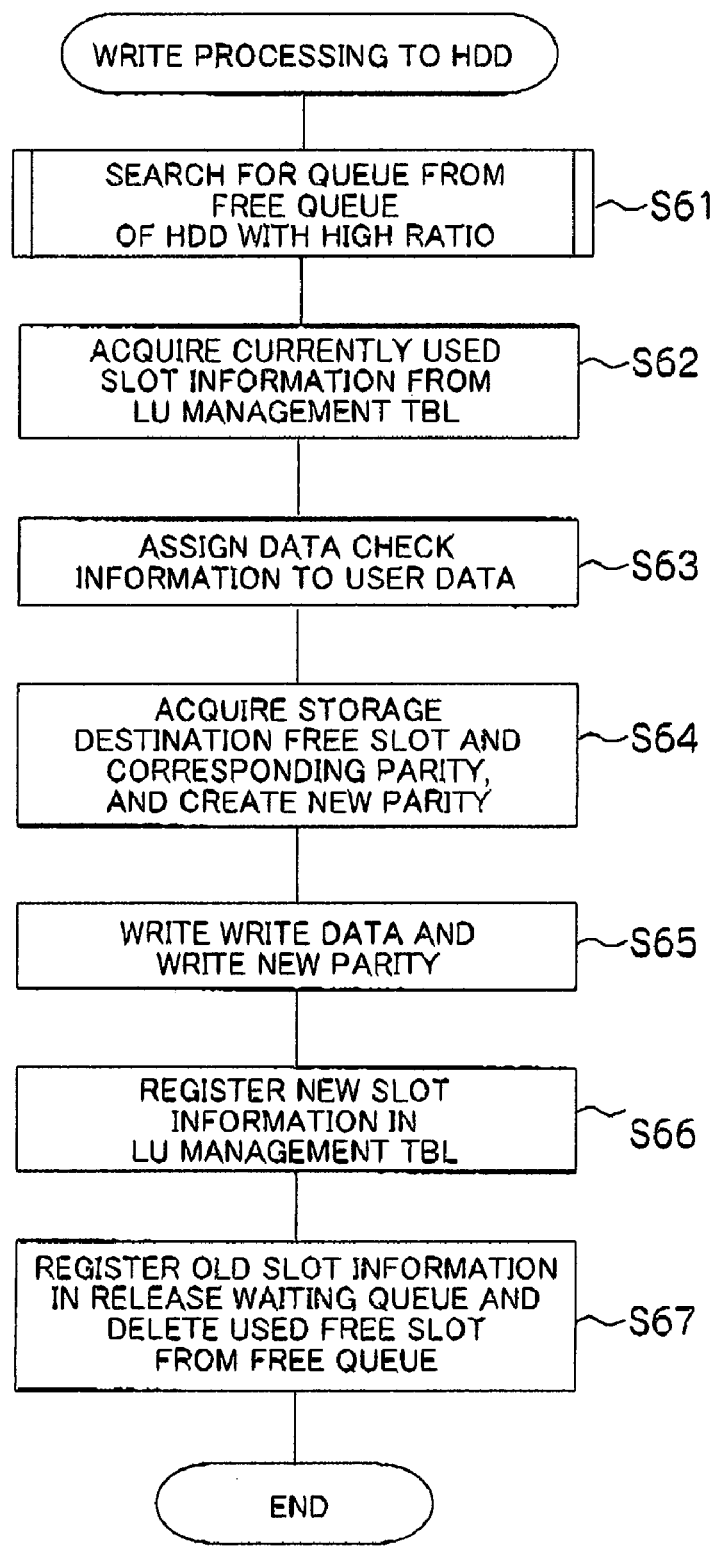
FIG. 21 is a flowchart explaining the write processing to an HDD.

The write processing of writing data into the HDD is now explained with reference to the flowchart shown in FIG. 21. When performing write processing of writing data into the HDD 20, in order to prevent the free slots 34 from biasing toward a specific HDD 20, the microprocessor 50 searches for the HDD allocation management table 114, searches for an HDD 20 (queue) with a high ratio from the free queue 116 to which HDDs 20 with a high ratio are registered (S61), acquires the currently used slot information as the slot information concerning the HDD 20 with a high ratio from the LU management table 112 (S62), and assigns additional information for checking data to the user data (S63).

The microprocessor 50 thereafter acquires parity corresponding to the free slot 34 to become the storage destination, creates new parity based on the acquired parity (S64), writes the write data and new parity in the free slot 34 (S65), registers the new slot information for using the free slot 34 as the data slot 30 in the LU management table 112 (S66), registers the data slot 30 storing old data as old slot information in the release waiting queue 62, deletes the free slot 34 from the free queue 134 in order to change the free slot 34 to a data slot 30 (S67), and then ends this processing routine.

Based on this processing, HDDs among HDD#1 to #4 with the highest ratio are sequentially allocated to the free slot 34 for storing data, and it is thereby possible to prevent the free slots 34 from biasing toward a specific HDD.

Figure 22:
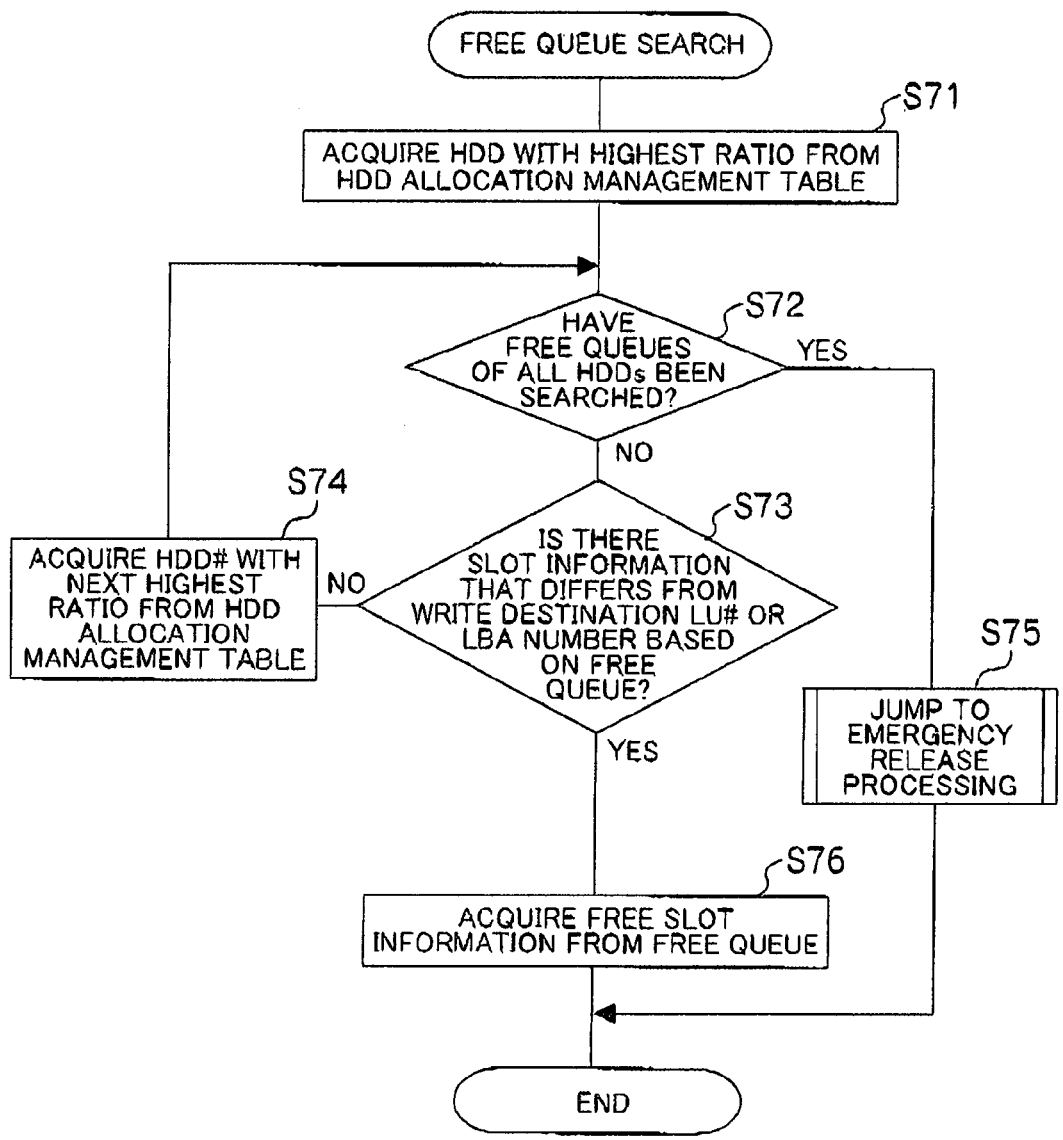
FIG. 22 is a flowchart explaining the free queue search processing.

The free queue search processing is now explained with reference to the flowchart shown in FIG. 22. Upon searching for the free queue 116, the microprocessor 50 acquires the HDD# with the greatest ratio from the HDD allocation management table 114 (S71), and determines whether all free queues 116 have been searched (S72). If it is determined that all free queues 116 have not been searched, the microprocessor 50 sequentially determines the HDD# with the greatest ratio from the free queue 116 in order to determine whether there is slot information with a different write destination LU# or LBA number (S73). If the microprocessor 50 obtains a negative result in the determination at this step, it acquires the HDD# with the next greatest ratio from the HDD allocation management table 114 (S74), and returns to the processing at step S72.

If the microprocessor 50 determines that the free queues 116 of all HDDs have been searched at step S72, it jumps to the emergency release processing (S75), and then ends this processing routine.

If the microprocessor 50 obtains a positive result in the determination at step S73, it acquires free slot information from the free queue 116 (S76), and then ends this processing routine.

Based on this processing, it is possible to sequentially acquire HDDs with the highest ratio that corresponds to the free slot 34.

Figure 23:
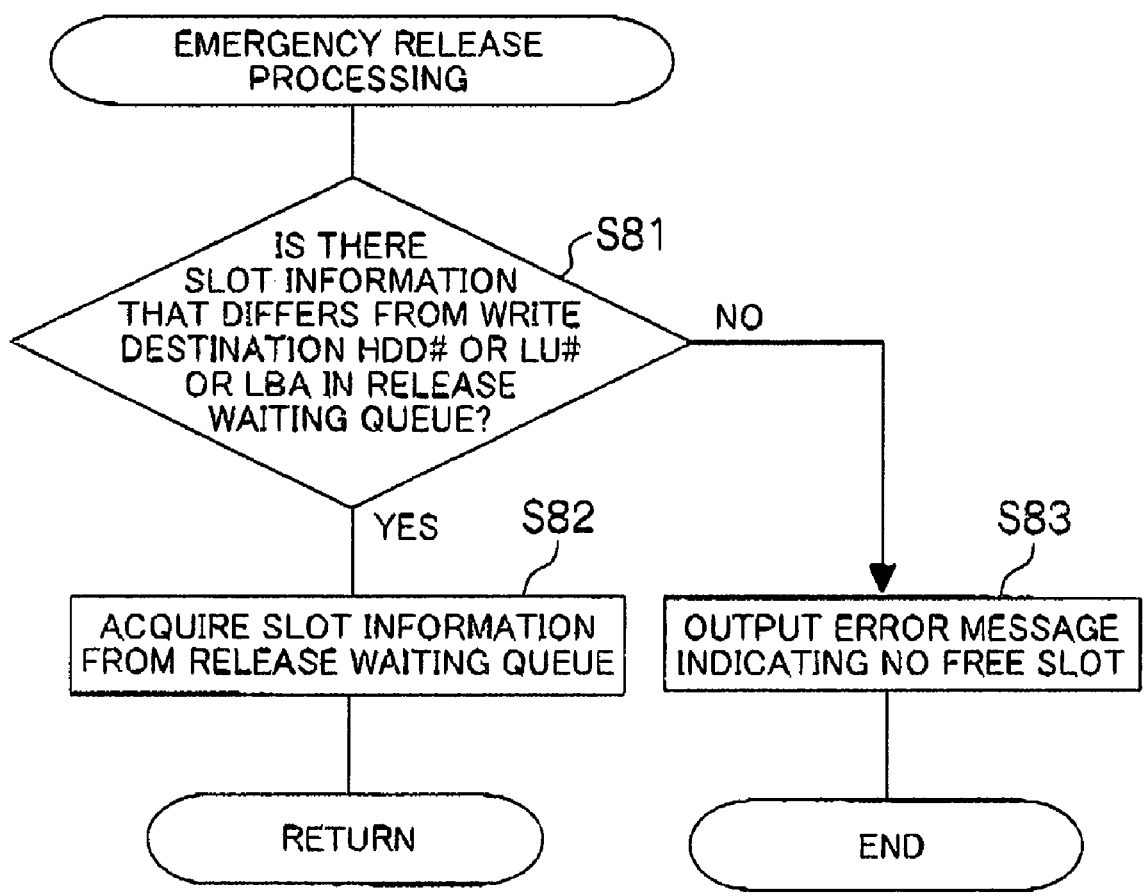
FIG. 23 is a flowchart explaining the release waiting slot emergency release processing.

The release waiting slot emergency release processing is now explained with reference to the flowchart shown in FIG. 23. Foremost, the microprocessor 50 determines whether there is slot information with a different write destination HDD# or LU# or LBA from the release waiting queue 60 (S81), and, upon obtaining a positive result in this determination, acquires slot information from the release waiting queue 60 (S82), and then returns to the free queue search processing.

Meanwhile, if a negative result is obtained in the determination at step S81, the microprocessor 50 outputs an error message to indicate that a free slot 35 does not exist (S83), displays an error message on the screen of the management terminal 18, and thereby ends this processing routine.

According to the present embodiment, it is possible to guarantee that correct information is stored in the HDD 20 as the storage unit without depending on RAW technology, reduce the overheard during the writing of data, guarantee the reliability of data in the HDD 20 without compressing the area of the cache memory 44, and further present the free slots 34 from being biased toward a specific HDD.

What is claimed is:

1. A storage apparatus, comprising:
    a storage unit including a data storage area for storing data to be accessed by a host system and a free storage area in which NULL is stored; and
    a control unit for sending and receiving information to and from the host system in response to an access request, the access request including a logical unit number (LUN) and a logical block address (LBA) from the host system, and performing a write access or a read access to the storage unit based on the access request,
    wherein the control unit has management information for managing a correspondence relationship between a pointer of the data storage area and the LBA and a logical unit,
    wherein during a write access to the logical unit at a LUN and the LBA corresponding to a first storage area of the data storage area, the control unit sets a second storage area of the free storage area as a new data storage destination that differs from the first storage area, stores data and data identification information including the LUN and the LBA attached to a write access request in the second storage area, changes the pointer corresponding to the logical unit and the LBA from the pointer of the first storage area to the pointer of the second storage area, starts managing the first storage area as the free storage area, and starts managing the second storage area as the data storage area, and
    wherein during a read access targeting the logical unit and LBA corresponding to the second storage area of the data storage area, the control unit checks whether or not the LUN and the LBA attached to a read access request coincide with the LUN and the LBA included in the data identification information for the second storage area.

2. The storage apparatus according to claim 1,
wherein, during a write access to the storage unit, the control unit nullifies data stored in the first storage area as old data.

3. The storage apparatus according to claim 1,
wherein, during a write access to the storage unit, if the data and the data identifying information attached to the write access request are stored in the new data storage destination, the control unit sets the data identifying information as nullification determination information during a read access to the new data storage destination.

4. The storage apparatus according to claim 1,
wherein, during a read access to the storage unit, the control unit reads the data and the data identifying information from the first storage area designated in the read access request, compares the read data identifying information and the data identifying information attached to the read access request, and transfers the read data to the host system on the condition that the read data identifying information and the data identifying information attached to the read access request coincide.

5. The storage system according to claim 1,
wherein, during a read access to the storage unit, the control unit reads the data and the data identifying information from the first storage area designated in the read access request, compares the read data identifying information and the data identifying information attached to the read access request, and, if the read data identifying information and the data identifying information attached to the read access request do not coincide, reads information related to the read data from the data storage area, recovers the data stored in the first storage area, and transfers the recovered data to the host system.

6. The storage apparatus according to claim 1,
wherein, during a write request to the storage unit, the control unit nullifies data stored in the first storage area as old data; and
wherein, during a read access to the storage unit, the controller unit reads the data and the data identifying information from the first storage area designated in the read access request, and, if the read data is nullified data, transfers a message to the effect that the overwriting of data in accordance with the write access was unsuccessful to the host system.

7. The storage apparatus according to claim 1,
wherein, during a write access to the storage unit, if the data and the data identifying information are stored in the new data storage, the control unit changes the affiliation of an area corresponding to the new data storage destination to the data storage area, and, if the data and the data identifying information attached nullifies data stored in the first storage area as old data, and, when the data is nullified, changes the affiliation of an area in which data was nullified in the data storage area from the data storage area.

8. The storage apparatus according to claim 1,
wherein, during a write access to the storage unit, if the data and the data identifying information are stored in the new data storage, the control unit changes the affiliation of an area corresponding to the new data storage to the data storage area, and, if the data and the data identifying information attached to the write access request are stored in the new data storage destination, the control unit records and manages the first storage area as a nullification candidate release waiting slot in a release waiting queue, thereafter nullifies data of the release waiting slot recorded in the release waiting queue, and, when the data is nullified, changes the affiliation of an area in which data was nullified in the data storage area from the data storage.

9. The storage apparatus according to claim 1,
wherein, during a write access to the storage unit, if the data and the data identifying information are stored in the new data storage, the control unit changes the affiliation of an area corresponding to the new data storage destination to the data storage area, and, if the data and the data identifying information attached to the write access request are stored in the new data storage destination, the control unit records the first storage area as a nullification candidate release waiting slot in a release waiting queue for each device configuring the storage unit, records and manages a ratio of the release waiting slot count in relation to the total slot count to be nullified for each of the devices, thereafter sequentially nullifies data of the release waiting slot corresponding to a device in which the ratio is high among the devices recorded in the release waiting queue, and, when the data is nullified, changes the affiliation of an area in which data was nullified in the data storage area from the data storage area.

10. The storage apparatus according to claim 1,
wherein the data identifying information is configured from a logical unit number when the data storage area of the storage unit is configured from a logical area, and a logical block address recognized by the host system.

* * * * *